(12) United States Patent
Fujishiro

(10) Patent No.: US 10,048,503 B2
(45) Date of Patent: Aug. 14, 2018

(54) HEAD-MOUNTED TYPE IMAGE DISPLAY DEVICE

(71) Applicant: SEIKO EPSON CORPORATION, Tokyo (JP)

(72) Inventor: Takeshi Fujishiro, Shiojiri (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 15/351,050

(22) Filed: Nov. 14, 2016

(65) Prior Publication Data

US 2017/0261753 A1    Sep. 14, 2017

(30) Foreign Application Priority Data

Mar. 14, 2016   (JP) .................................. 2016-050167

(51) Int. Cl.
*G02B 27/01* (2006.01)
*G06F 1/16* (2006.01)

(52) U.S. Cl.
CPC ......... *G02B 27/0176* (2013.01); *G06F 1/163* (2013.01); *G02B 2027/0156* (2013.01)

(58) Field of Classification Search
CPC ............................ G02B 27/0176; G06F 1/163
See application file for complete search history.

(56) References Cited

U.S. PATENT DOCUMENTS

2015/0219901 A1* 8/2015 Morimoto ............ G02B 27/017
345/8
2016/0309143 A1* 10/2016 Fu ..................... H04N 13/0497

FOREIGN PATENT DOCUMENTS

| JP | 4673897 B2 | 4/2011 |
| JP | 2014-013954 A | 1/2014 |
| JP | 2015-126396 A | 7/2015 |
| WO | 2015/097959 A1 | 7/2015 |

* cited by examiner

*Primary Examiner* — Andrew Sasinowski
(74) *Attorney, Agent, or Firm* — Oliff PLC

(57) ABSTRACT

A head-mounted type image display device including a disposition section that is disposed at a position corresponding to a forehead of a user; an image display section that has a left side display section and a right side display section; and a pair of arms that are respectively positioned at portions on a front side of the disposition section, are rotatably supported on the disposition section about rotational shafts along a parallel direction that is a direction in which the left side display section and the right side display section are arranged, and support the image display section. The rotational shafts are provided on a surface different from a surface facing the forehead in the disposition section and are positioned inside both end portions of the disposition section when viewed from a direction orthogonal to the parallel direction.

12 Claims, 12 Drawing Sheets

HEAD-MOUNTED TYPE IMAGE DISPLAY DEVICE

BACKGROUND

1. Technical Field

The present invention relates a head-mounted type image display device.

2. Related Art

In the related art, a head-mounted type image display device such as a Head Mounted Display (HMD) which is mounted on a head of a user is known (for example, see JP-A-2015-126396).

The head-mounted type image display device described in JP-A-2015-126396 includes a first display section and a second display section which are respectively provided at positions facing left and right eyes of the user. Each of the first display section and the second display section includes a display plate (light guide plate) for displaying an image on the left and right eyes of the user and an optical unit projecting the image on the display plate. Therefore, the user can visually recognize the image that is projected from the optical unit.

In addition, each display plate described above is supported by a frame and each frame is connected to a support section for supporting the display plate at positions facing the left and right eyes of the user when mounting the head-mounted type image display device on a head. The support section includes a band member and an ear hooking section, and is mounted by mounting the band member on a back of the head of the user and hooking the ear hooking section around an ear of the user.

Furthermore, each frame of the head-mounted type image display device described in JP-A-2015-126396 is connected to each of a first connecting section and a second connecting section, and the first connecting section and the second connecting section are detachably configured. Therefore, mounting of the head-mounted type image display device on the head of the user is facilitated and the band member is portably configured to be hung around a neck when opening (separating) the first connecting section and the second connecting section by attaching and detaching the first connecting section and the second connecting section.

However, the head-mounted type image display device described in JP-A-2015-126396 is also often used by operators or the like who execute precise operations and wear a covering member such as a helmet on the head. Such operators execute an operation (hereinafter, may be referred to as a non-visual operation) which is performed without viewing a display section of the head-mounted type image display device in addition to an operation (hereinafter, may be referred to as a visual operation) which is performed while viewing the display section of the head-mounted type image display device.

However, in the head-mounted type image display device described in JP-A-2015-126396, for example, when alternately performing a visual operation and a non-visual operation, it is necessary to perform the connection and opening of the first connecting section and the second connecting section each time. In other words, the operator needs to mount and remove the head-mounted type image display device each time.

Therefore, especially in a case where the user (operator) or the like wears a covering member such as a helmet, it has been desired to provide a configuration which is capable of causing only the image display section for displaying an image to retreat from in front of the eyes of the user (operator). That is, it has been desired to provide a head-mounted type image display device which is capable of enlarging a retreat amount (retreat distance) of the image display section.

SUMMARY

An advantage of some aspects of the invention is to provide a head-mounted type image display device which is capable of enlarging a retreat amount of an image display section.

A head-mounted type image display device according to a first aspect of the invention includes a disposition section that is disposed at a position corresponding to a forehead of a user; an image display section that has a left side display section and a right side display section which are respectively provided corresponding to a left eye and a right eye of the user, and respectively display an image to be observable for the user; and a pair of arms that are respectively positioned at portions on a front side of the disposition section, are rotatably supported on the disposition section about rotational shafts along a parallel direction that is a direction in which the left side display section and the right side display section are arranged, and support the image display section. The rotational shafts are provided on surfaces different from a surface facing the forehead in the disposition section and are positioned inside both end portions of the disposition section when viewed from a direction orthogonal to the parallel direction.

As the position corresponding to the head of the user, in addition to the head of the user, in a case where the user wears a covering member such as a helmet and a hat, the position of the head can be exemplified. In addition, as the head-mounted type image display device, in addition to a see-through head-mounted type image display device which can also observe the outside, a so-called closed head-mounted type image display device which cannot observe the outside can be exemplified.

In the first aspect, the pair of arms, which support the left side display section and the right side display section respectively provided corresponding to the left eye and the right eye of the user, are rotatably configured about the rotational shaft along the parallel direction in which the left side display section and the right side display section are arranged. Therefore, the pair of arms rotate along the rotational shaft and thereby it is possible to move the image display section in a direction away from in front of the eyes of the user. Therefore, since the pair of arms rotate about the rotational shaft, when executing a non-visual operation, it is possible for the image display section to retreat from in front of the eyes without removing the head-mounted type image display device from a position corresponding to the head of the user. That is, it is possible to increase a retreat amount of the image display section. Therefore, in a case where the user executes any one of a visual operation in which the image display section is viewed and a non-visual operations in which the image display section is not viewed, since labor of removing the head-mounted type image display device can be omitted, it is possible to improve the efficiency of the operation.

Here, in a case where the rotational shafts are provided on an inner periphery of the disposition section, or in a case where the rotational shafts are provided on an outer periphery of the disposition section and are provided in both end portions of the disposition section, in order to provide the rotational shaft in the disposition section for causing a flange portion of the covering member to retreat in accordance with a shape of the forehead of the user or the covering member, the disposition section is required to extend on both end sides in the parallel direction. Therefore, the head-mounted type image display device is increased in size.

In contrast, in the first aspect with this configuration, the rotational shafts are provided on a surface different from the surface facing the forehead in the disposition section and are disposed inside the both end portions of the disposition section when viewed from a direction orthogonal to the parallel direction. Therefore, it is possible to provide the rotational shafts without extending the disposition section on the both end sides in the parallel direction. Therefore, it is possible to decrease the size of the head-mounted type image display device.

In the first aspect, it is preferable that each of the pair of arms includes a shaft section that is rotatably supported on the disposition section, and a restriction section that abuts against the disposition section and restricts rotation of the images displayed by the left side display section and the right side display section from an observation position in which the images are capable of being observed at a user side.

In the first aspect with this configuration, since the pair of arms include the shaft sections that are rotatably supported on the disposition section, it is possible to increase the retreat amount of the pair of arms. In addition, since the regulation section, which regulates the rotation of the images displayed by the left side display section and the right side display section from the observation position in which the images are capable of being observed at the user side, is provided, it is possible to prevent the images displayed by the left side display section and the right side display section from being not observed when the image display section is too close to the user.

In the first aspect, it is preferable that the shaft section is supported on a bottom portion of the disposition section.

In the first aspect with this configuration, since the shaft section is supported on the bottom portion of the disposition section, it is possible to stably hold the image display section that is supported by the arms, for example, compared to a case where the shaft section is supported on a surface of the disposition section on a side opposite to the user.

In addition, it is possible to reduce a rotation range of the arms, for example, compared to a case where the shaft section is supported on a ceiling portion that is positioned on a side opposite to the bottom portion of the disposition section. Therefore, it is possible to decrease the size of the head-mounted type image display device.

In the first aspect, it is preferable that the pair of arms include a left side arm that is connected to the left side display section, and a right side arm that is connected to the right side display section. It is preferable that the left side arm includes a left side shaft section that is rotatably supported on the disposition section, a first left side extending section that extends from the left side shaft section on a side opposite to the right side arm along the parallel direction, and a second left side extending section that is bent at a tip of the first left side extending section in an extending direction and is connected to a left side end portion in the left side display section. It is preferable that the right side arm includes a right side shaft section that is rotatably supported on the disposition section, a first right side extending section that extends from the right side shaft section on a side opposite to the left side arm along the parallel direction, and a second right side extending section that is bent at a tip of the first right side extending section in an extending direction and is connected to a right side end portion in the right side display section.

In the first aspect with this configuration, since each of the left side arm and the right side arm includes the left side shaft section and the right side shaft section, it is possible to reliably rotate the left side display section and the right side display section respectively supported on the left side arm and the right side arm, for example, compared to a case where each of the left side arm and the right side arm includes one shaft section. In addition, the second left side extending section is connected to the left side end portion in the left side display section, that is, the end portion on the side opposite to the user, and the second right side extending section is connected to the right side end portion in the right side display section, that is, the end portion on the side opposite to the user. Therefore, it is possible to stably hold the left side display section and the right side display section compared to a case where the second left side extending section and the second right side extending section are connected to the end portions of the left side display section and the right side display section on the user side.

In addition, for example, when the user wears the covering member such as a helmet on the head, if the second left side extending section and the second right side extending section are connected to the end portions of the left side display section and the right side display section on the user side, the second left side extending section and the second right side extending section come into contact with the flange of the helmet and the like, and each of the left side display section and the right side display section may not be retreated from in front of the eyes of the user.

In contrast, in the first aspect with this configuration, the second left side extending section and the second right side extending section are connected to the end portions of the left side display section and the right side display section on the side opposite to the user. Therefore, since the second left side extending section and the second right side extending section do not come into contact with the flange, it is possible to cause each of the left side display section and the right side display section to reliably retreat from in front of the eyes of the user.

In the first aspect, it is preferable that one of each of the pair of arms and the image display section has a slide device which is connected to the other side slidably in a direction in which the image display section moves toward and away from the disposition section.

In the first aspect with this configuration, since the image display section is configured to be slidable in the direction in which the image display section moves toward and away from the disposition section, it is possible to adjust a distance between the disposition section and the image display section. Therefore, since the position of the image display section can be adjusted in accordance with the position of the eyes of the user, it is possible to improve convenience and versatility of the head-mounted type image display device.

In the first aspect, it is preferable to further include a band section that extends from the disposition section and is disposed at a position corresponding to a back head of the user.

In the first aspect with this configuration, since the disposition section is disposed at the position corresponding to the forehead and the band section is disposed at the position corresponding to the back head, it is possible to pinch the forehead and the back head (positions corresponding to the forehead and the back head) by the disposition section and the band section when mounting the head-mounted type image display device. Therefore, it is possible to reliably mount (fix) the head-mounted type image display device on the head of the user.

In the first aspect, it is preferable to further include a pad that is attached to the disposition section on a forehead side, and for the pad and the band section to be configured of an elastic member.

For example, in a case where the pad connected to the disposition section on the forehead side is formed of a relatively stiff member, since the pad is not elastically deformed, a mounting feeling of the head-mounted type image display device may be deteriorated.

In contrast, in the first aspect with this configuration, since the pad is formed of the elastic member, the pad is elastically deformed and thereby it is possible to improve a wearing feeling of the head-mounted type image display device. In addition, since the band section is also formed of an elastic member, similar to the pad, when mounting the head-mounted type image display device, the pad and the band section are elastically deformed. Therefore, it is possible to pinch the forehead and the back head while applying an appropriate pressure to the forehead and the back head of the user (positions corresponding to the forehead and the back head, respectively). Therefore, it is possible to further improve wearability of the head-mounted type image display device.

In the first aspect, it is preferable that the disposition section includes a control section that controls at least a part of the image display section, and the control section is covered by an inner case.

In the first aspect with this configuration, since the control section is covered by the inner case, for example, even in a case where an impact is applied to the disposition section, it is possible to alleviate stress acting on the control section due to the impact by the inner case. Therefore, it is possible to improve impact resistance with respect to the control section and to stably operate the head-mounted type image display device.

In the first aspect, it is preferable that the disposition section includes ribs that extend from a surface of the disposition section on a vertical side and extend from an outer edge of the inner case toward the both ends of the disposition section, and discharge openings that discharge a fluid flowing through the ribs to an outside of the disposition section.

Here, when using the head-mounted type image display device outdoors, a possibility that dust and water may enter the inside of the disposition section is increased compared to a case where the head-mounted type image display device is used indoors.

In contrast, in the first aspect with this configuration, since the discharge openings, which discharge a fluid such as water passing through the ribs extending from the outer edge of the inner case toward the both ends of the disposition section to the outside of the disposition section, is provided, it is possible to discharge dust and water entering the inside of the disposition section to the outside of the disposition section. Therefore, it is possible to prevent the control section and the like disposed in the disposition section from being damaged by a fluid entering inside the disposition section.

In the first aspect, it is preferable that the disposition section is mounted on the covering member that is mounted on the head of the user.

As the covering member, in addition to the helmet, a cap and the like can be exemplified.

In the first aspect with this configuration, the head-mounted type image display device can be mounted on the covering member that protects the head of the user. Even in the case, in the first aspect with this configuration, when the pair of arms are rotated, the pair of arms do not abut against the flange portion of the helmet, the cap, or the like. Therefore, the user can move the image display section in the head-mounted type image display device in accordance with an operation executed by the user while wearing the helmet, the cap, or the like.

Therefore, since there is no need to remove the head-mounted type image display device from the helmet in accordance with each of a visual operation and a non-visual operation, it is possible to improve operation efficiency of the user. In addition, there is no need for the user to feel troublesome in removing the head-mounted type image display device, and remove the helmet on which the head-mounted type image display device is mounted and then execute the non-visual operation. Therefore, it is possible to improve safety of the user.

A head-mounted type image display device according to a second aspect of the invention is a head-mounted type image display device that is used by being mounted on a covering member that is mounted on a head of a user and has a flange portion, and including a disposition section that is disposed at a position of the covering member corresponding to a forehead of a user; an image display section that has a left side display section and a right side display section which are respectively provided corresponding to a left eye and a right eye of the user, and respectively display an image to be observable for the user; and a pair of arms that are respectively positioned at portions on a front side of the disposition section, are rotatably supported on the disposition section about rotational shafts along a parallel direction that is a direction in which the left side display section and the right side display section are arranged, and support the image display section. A length of a first perpendicular line extending from a virtual line to an upper surface of the image display section through a center of the rotational shaft and along the parallel direction is greater than a length of a second perpendicular line extending from the virtual line to the foremost end of the flange portion when viewing the covering member on which the head-mounted type image display device is mounted in a direction along the parallel direction.

The foremost end of the flange portion is a portion that is positioned at a position that is the farthest from the user when the covering member is mounted on the head and the position is not limited to the position of the center when viewing the flange portion from a direction orthogonal to the parallel direction.

However, when the head-mounted type image display device according to the first aspect is provided in the covering member having the flange portion, in a case where the length of the first perpendicular line extending from the virtual line through the center of the rotational shaft to the upper surface of the image display section is equal to or less than the length of the second perpendicular line extending from the virtual line to the foremost end of the flange portion, if the image display section is retreated from in front of the eyes by rotating the pair of arms, the image display section may come into contact with the flange portion.

In contrast, in the second aspect, when viewing the covering member on which the head-mounted type image display device according to the second aspect is mounted in the direction along the parallel direction, the length of the first perpendicular line extending from the virtual line to the upper surface of the image display section through the center of the rotational shaft is greater than the length of the second perpendicular line extending from the virtual line to the foremost end of the flange portion. Therefore, when rotating the arms, it is possible to reliably prevent the image display section from coming into contact with the flange portion. Therefore, it is possible for the image display section to reliably retreat and it is possible to prevent the image display section and the head-mounted type image display device accordingly from being damaged.

In the second aspect, it is preferable that the rotational shafts are provided on a surface different from a surface facing the forehead in the disposition section and are positioned inside both end portions of the disposition section when viewed from a direction orthogonal to the parallel direction.

In the second aspect with this configuration, it is possible to achieve the same effects as those of the head-mounted type image display device according to the first aspect.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, an embodiment of the invention will be described with reference to the drawings.

Schematic Configuration of Head-Mounted Type Image Display Device

Figure 1:
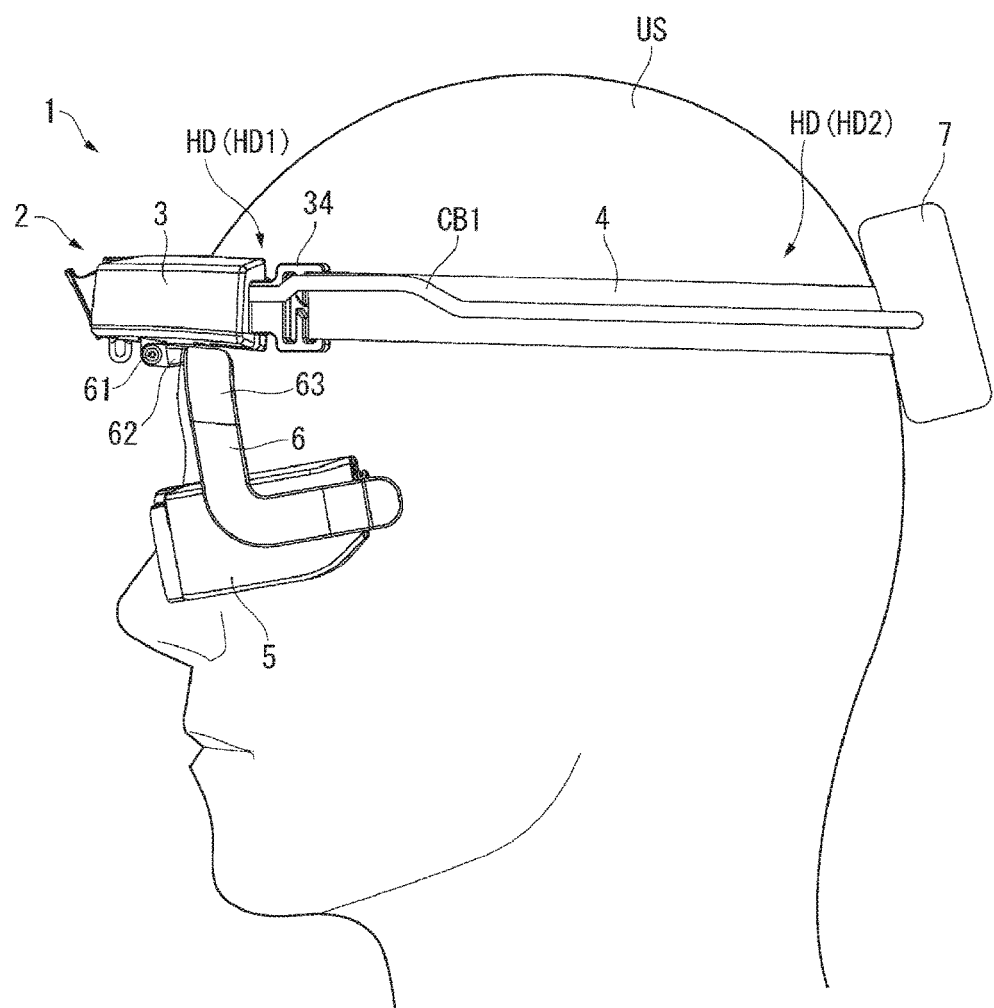
FIG. 1 is a side view illustrating a virtual image display device according to an embodiment of the invention.

FIG. 1 is a perspective view illustrating a state where a virtual image display device 1 according to the embodiment is mounted on a user US.

The virtual image display device 1 according to the embodiment corresponds to a head-mounted type image display device according to the invention. As illustrated in FIG. 1, such a virtual image display device 1 is a HMD that is used by mounting on a head HD of the user US, a mounting portion of a helmet and the like (specifically, positions corresponding to the portions described above of the head HD including a forehead HD1 and a back head HD2). The virtual image display device 1 is the see-through HMD which displays a virtual image that is capable of being visible by the user US and capable of observing the outside by transmitting external light.

As illustrated in FIG. 1, the virtual image display device 1 includes a headband section 2, an image display section 5, a pair of arms 6, a controller 7.

Specifically, the virtual image display device 1 according to the embodiment includes the headband section 2 (main section 3) that is mounted on a position corresponding to the head HD (forehead HD1) of the user US, the image display section 5 that has a left eye image display device 51L and a right eye image display device 51R (see FIG. 2) which are respectively provided corresponding to a left eye and a right eye of the user, and respectively display an image to be observable for the user, and the pair of arms 6 that are respectively positioned at portions on a front side (+Z direction side) of the main section 3, are rotatably supported on the main section 3 about rotational shafts along a parallel direction (+X direction) that is a direction in which the left eye image display device 51L and the right eye image display device 51R are arranged, and support the image display section 5. The rotational shafts are provided on an outer periphery of the main section 3 and are positioned inside both end portions of the main section 3 when viewed from the direction (+Z direction) orthogonal to the parallel direction.

These configurations will be described below in detail.

Moreover, in the following description, the +Z direction is a direction toward the outside of the head HD through a center between both eyes among directions orthogonal to an axial direction of the head HD of the user US who wears the virtual image display device 1. The +X direction and a +Y direction are respectively orthogonal to the +Z direction and are orthogonal to each other. Among them, the +Y direction is a direction from a flange portion side toward a head top side along the axial direction of the head HD and the +X direction is a direction from a left side to a right side when viewed from the user US. A +C direction is a counterclockwise direction when viewed from the side in the +Y direction among the circumferential directions about the axial direction of the head HD.

Furthermore, the side of the +Z direction indicates a tip side in the +Z direction and a −Z direction indicates abase end side in the +Z direction. Also the same as the other directions.

Configuration of Headband Section

The headband section 2 is a portion which pinches the head HD and mounts the virtual image display device 1 on the head HD. As illustrated in FIG. 1, the headband section 2 includes the main section 3 and a band section 4. Moreover, The main section 3 corresponds to a disposition section according to the invention.

Configuration of Main Section

Figure 2:
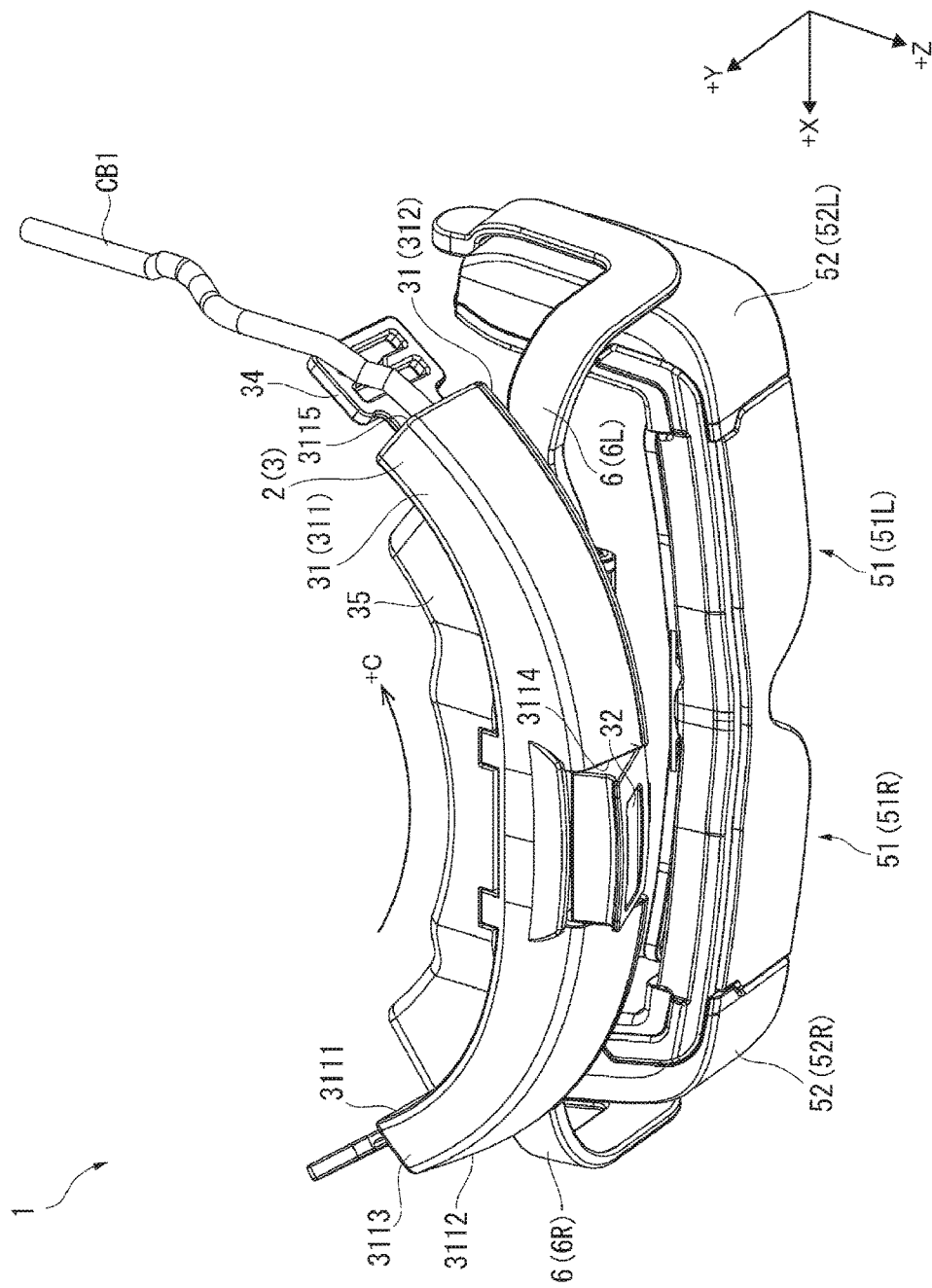
FIG. 2 is a perspective view illustrating the virtual image display device in the embodiment.
Figure 3:
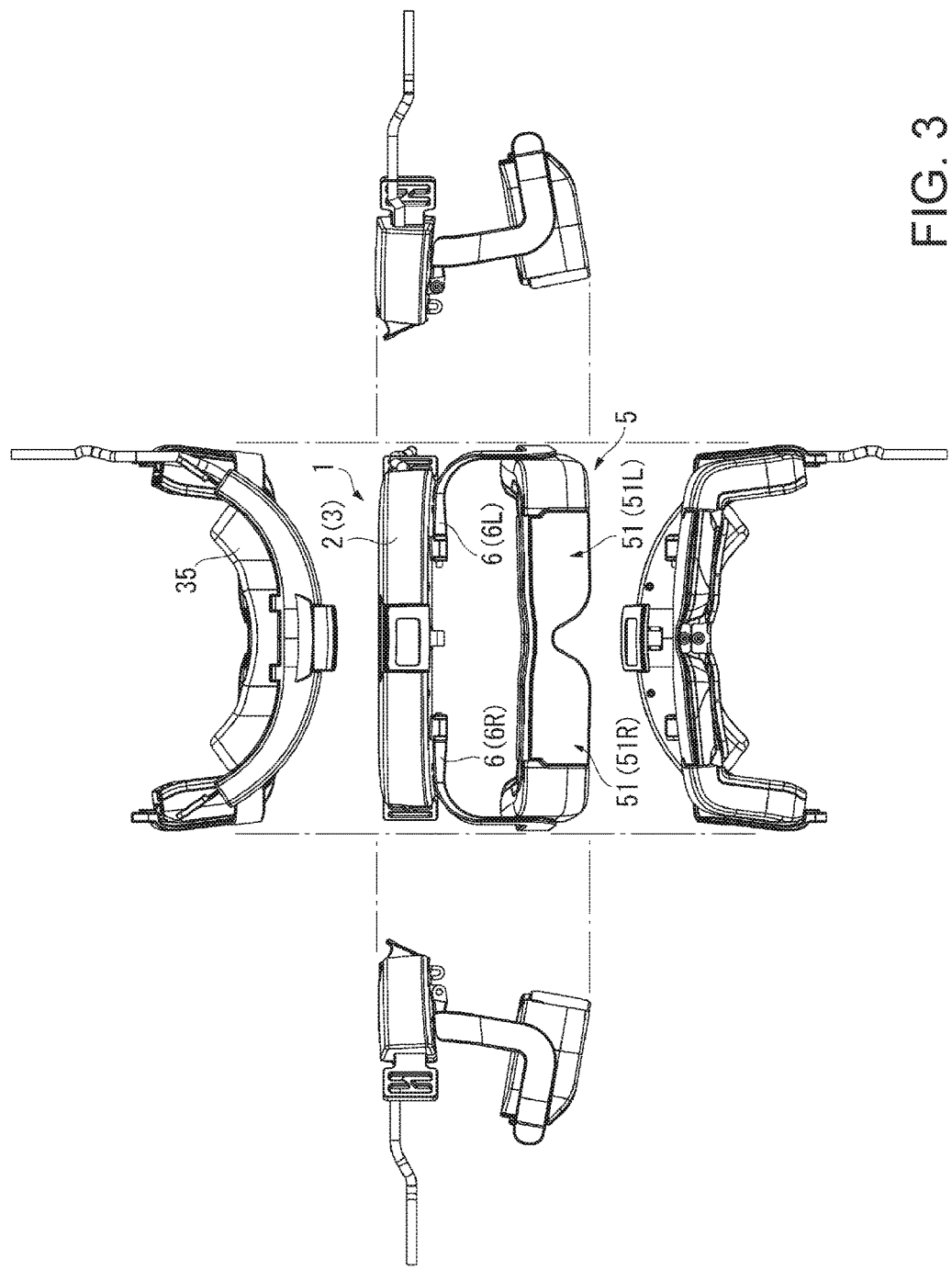
FIG. 3 is five-side view of the virtual image display device in the embodiment.

FIG. 2 is a perspective view illustrating the virtual image display device 1 when viewed from the side in the +Z direction and FIG. 3 is a five-side view of the virtual image display device 1.

As illustrated in FIG. 1, the main section 3 is disposed at a position corresponding to the forehead HD1 (in a case where the covering member such as the helmet is mounted on the head HD, a portion in the covering member corresponding to the forehead HD1 of the user US) of the head HD. As illustrated in FIGS. 2 and 3, the main section 3 has an arc shape along the +C direction when viewed from the side in the +Y direction and has an arc shape gently extending in the −Y direction toward the −Z direction when viewed from the side in the +X direction. In other words, the main section 3 has an arc shape of a substantially U-shape along the forehead HD1 of the head HD when viewed from the side in the +Y direction.

Such a main section 3 is connected to the controller 7 receiving various input operations via a cable CB1 by the user US with respect to the virtual image display device 1. Operation information and image information are transmitted from the controller 7 to a control section 33 (see FIG. 4). In addition, in the embodiment, the controller 7 is housed in a case (not illustrated) attached to the band section 4 and is fixed to the back head HD2.

Configuration of Band Section

As illustrated in FIG. 1, the band section 4 attached to the main section 3 is formed in an annular shape surrounding a periphery of the head HD of the user US. The band section 4 is a portion which extends from the main section 3 and is disposed at a position corresponding to the back head HD2 of the user US. The band section 4 is configured of an elastic member such as rubber. Such a band section 4 is attached to connecting sections 34 of the main section 3 and is disposed so as to surround the head HD of the user US. Therefore, the main section 3 and the headband section 2 accordingly are mounted along the head HD of the user US.

In addition, the connecting sections 34 are positioned inside both end portions of the image display section 5 when viewed from the side in the +Z direction. Therefore, even when the user US wears the covering member such as the helmet having unevenness, the main section 3 can be reliably mounted on the covering member by the band section 4.

Specifically, the main section 3 is configured to be short in a horizontal direction (+X direction) with respect to the head HD of the user US or a helmet M and is fixed by tightening the band section 4 along a shape of the head HD of the user US or the helmet M in a state where a pad 35 of the main section 3 abuts against the head HD of the user US or the forehead HD1 of the helmet M. For example, since a length of a flange portion M2 of the helmet M is 4 to 5 cm, even if the shapes of the head HD of the user and the helmet M are different, the virtual image display device 1 is easily mounted and flipping-up can be reliably performed by the configuration described above.

Configuration of Outer Case

As illustrated in FIGS. 2 and 3, the main section 3 has an outer case 31, an imaging section 32, the control section 33 (see FIG. 4), and the connecting sections 34.

The outer case 31 is formed to be curved in an arc shape (substantially semicircular shape) along the head HD of the user US and is disposed along the forehead HD1. More specifically, the outer case 31 is disposed along the forehead HD1 of the user US and is fixed by the band section 4.

As illustrated in FIG. 2, such an outer case 31 has an upper case 311 that is positioned on the side in the +Y direction and a lower case 312 that is positioned on the side in the −Y direction. The upper case 311 and the lower case 312 are combined and thereby the outer case 31 is formed.

Configuration of Upper Case

As illustrated in FIG. 2, the upper case 311 has an inner surface 3111 that is positioned on the user US side and is bent along the +C direction so as to face the forehead HD1 of the user US, an outer surface 3112 that is a surface on a side opposite to the inner surface 3111, an upper surface 3113 on the side in the Y direction, a first opening 3114, and second openings 3115.

Among them, the first opening 3114 is formed at a position corresponding to substantially a center in the upper case 311 over the upper surface 3113 from the outer surface 3112. The imaging section 32 which is described below is disposed in the first opening 3114.

In addition, the second openings 3115 are formed at the both end portions in the upper case 311. The connecting sections 34 are disposed at the second openings 3115.

Configuration of Lower Case

Figure 4:
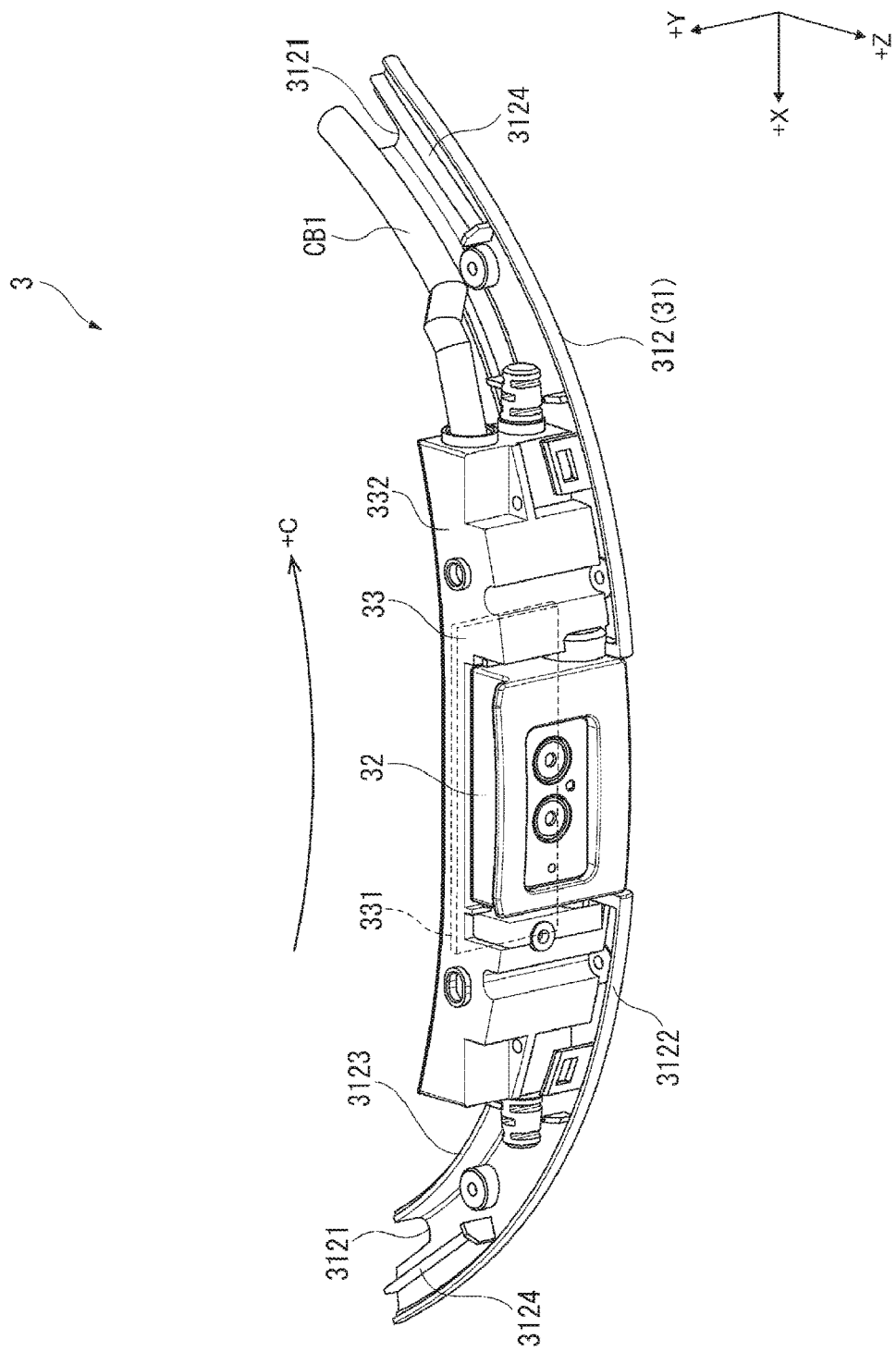
FIG. 4 is a perspective view illustrating an inside of a body portion in the embodiment.

FIG. 4 is a perspective view illustrating the inside of the main section 3 by removing the upper case 311 and is a perspective view illustrating the lowercase 312, the imaging section 32, and the control section 33. In addition, FIG. 5 is a perspective view illustrating the lower case 312.

The lowercase 312 rotatably supports a shaft section 61 of the pair of arms 6 which is described below in addition to supporting the control section 33 to which the imaging section 32 is attached. That is, the lowercase 312 corresponds to a bottom portion of the disposition section (main section 3) according to the invention. In addition, the lower case 312 is bent along the +C direction and is inclined toward the −Y direction as the lower case 312 goes to the −Z direction on the end portion sides in the +C direction and the −C direction.

Figure 5:
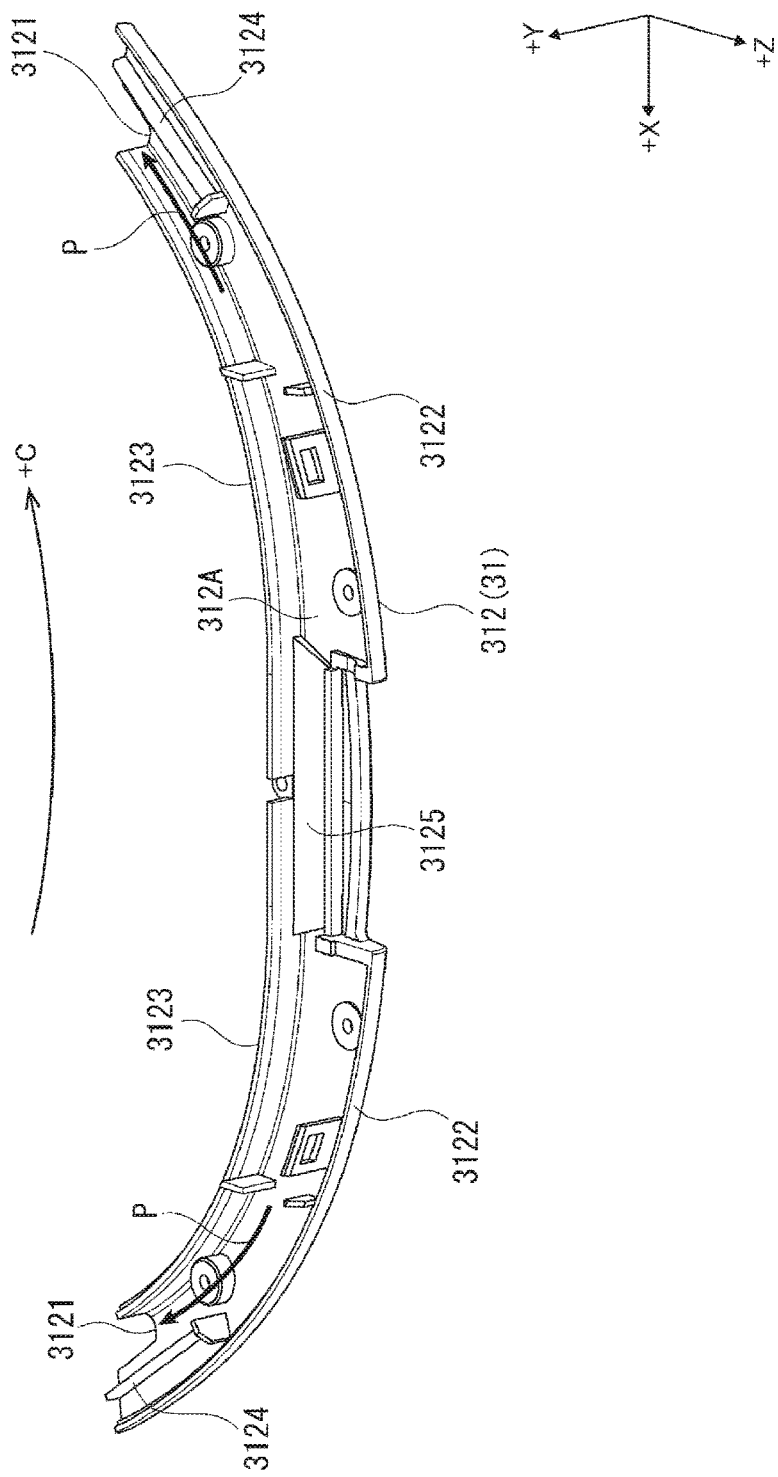
FIG. 5 is a perspective view illustrating a lower case in the embodiment.
Figure 7:
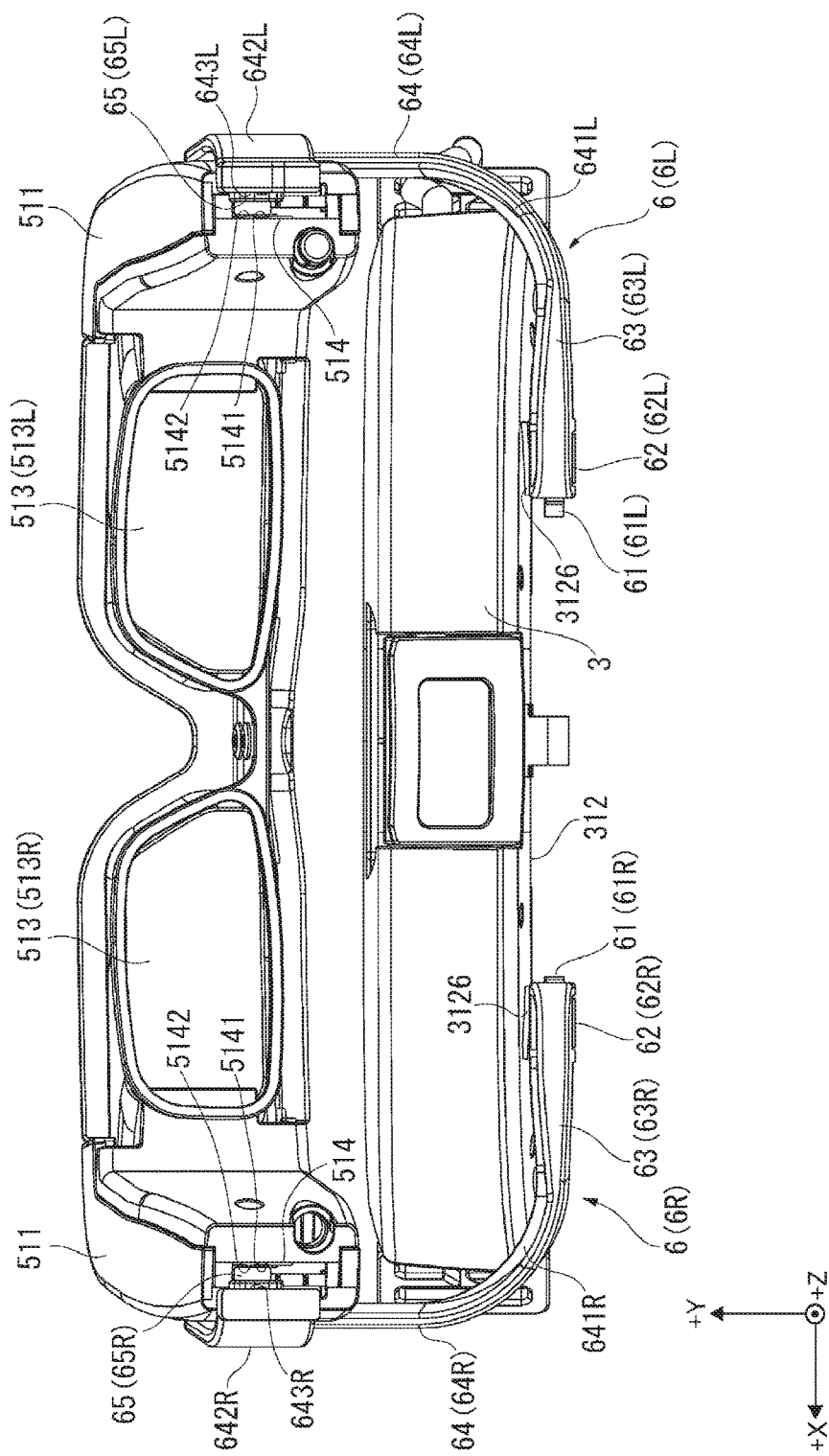
FIG. 7 is a front view illustrating the virtual image display device in a state where arms are flipped up in the embodiment.

As illustrated in FIGS. 4 and 5, the lower case 312 has two openings 3121, outer walls 3122, inner walls 3123, guide sections 3124, an installation section 3125, and a support section 3126 (see FIG. 7).

As illustrated in FIGS. 4 and 5, the openings 3121 are formed in the vicinity of the both ends in the +C direction and the −C direction.

The outer wall 3122 is a portion on a side opposite to the user US, that is, is a portion rising from an end edge on the side in the +Z direction toward the +Y direction in the lower case 312.

The inner wall 3123 is a portion rising from an end edge on the user US side toward the +Y direction in the lower case 312. The inner wall 3123 is a rising portion extending from a bottom surface 312A (surface on a side of the main section 3 in a vertical direction) toward the both ends of the main section 3 at an outer edge of an inner case 332 that houses the control section 33 described below. That is, the inner walls 3123 corresponds to ribs according to the invention and a fluid flowing through the inner walls 3123 is discharged from the openings 3121 to the outside of the main section 3.

As illustrated in FIG. 5, the guide sections 3124 are protrusions that are formed along the inner walls 3123 at the bottom surface 312A in the lower case 312 and are respectively formed at positions on the side in the +Z direction from the openings 3121. In the embodiment, the guide sections 3124 are respectively provided at positions corresponding to the end portion on the side in the +C direction and the end portion on the side in the −C direction at the center of the outer case 31.

Flow paths P that cause a liquid (fluid) such as water entering (inflow) the inside of the outer case 31 to flow through the openings 3121 is formed by the inner wall 3123 and the guide section 3124 in the bottom surface 312A in the lower case 312. That is, the opening 3121 corresponds to the discharge opening according to the invention.

Moreover, as described above, the lower case 312 is inclined toward the −Y direction as the lower case 312 goes toward the openings 3121. That is, the flow path P is formed along the bottom surface 312A that is inclined in the vertical direction in the vicinity of the opening 3121 when mounting on the user US who stands up. Therefore, the liquid entering the inside the outer case 31 can efficiently flow toward the openings 3121 along the bottom surface 312A and the inner walls 3123.

As illustrated in FIG. 5, the installation section 3125 is a portion corresponding to the first opening 3114 formed in the upper case 311, that is, a portion which is positioned substantially at a center in the lower case 312 in the +X direction and in which the control section 33 to which the imaging section 32 is attached is provided. As illustrated in FIG. 4, the control section 33 is connected to the cable CB1 connected to the controller and a cable CB2 (see FIG. 6) extending from the image display section 5. The cables CB1 and CB2 are pulled along the lower case 312 and are disposed in a space formed therein by combining the lower case 312 and the upper case 311.

Moreover, the configuration of the support section 3126 will be described later in detail.

As illustrated in FIG. 4, the imaging section 32 is disposed substantially at the center of the outer case 31 in the +X direction, that is, at a position corresponding to the forehead HD1 of the user US so that an imaging direction faces the side in the +Z direction. The imaging section 32 images the front of the user US, that is, a part of regions in a field of view of the user US. In addition, such an imaging section 32 is rotatably configured in a predetermined range about a predetermined rotational shaft.

Configuration of Control Section

As illustrated in FIG. 4, the control section 33 is disposed on the inside (that is, the installation section 3125) of the outer case 31 in a state where the imaging section 32 is attached.

The control section 33 includes a control substrate 331 as a control device and the inner case 332. Moreover, the control section 33 may be configured to include various detectors such as a gyro sensor and a geomagnetic sensor, and various devices such as a receiver for receiving a signal from a global positioning system (GPS) satellite in addition to the configurations described above.

The control substrate 331 is communicably connected to the controller 7, the image display section 5, and the imaging section 32, respectively via the cables CB1 and CB2, and controls at least one of functions of the virtual image display device 1.

As such functions, for example, image display control by which an image is displayed on the image display section 5 and various imaging processes with respect to a displayed image are exemplified, and imaging control of the imaging section 32 and various processes using a captured image are further exemplified. Furthermore, as the function, operation control of the virtual image display device 1 corresponding to an input signal from the controller 7 is exemplified. That is, a control content and a process content by the control substrate 331 is not specifically limited as long as the contents are at least a part of the functions which are realized in the virtual image display device 1.

In addition, the inner case 332 forms an inner space in which the control substrate 331 is housed and seals the inner space. That is, the inner case 332 has a waterproof property by covering the control substrate 331. Such an inner case 332 is disposed on the inside of the outer case 31, more particularly, in the installation section 3125 in a state of housing the control substrate 331.

As illustrated in FIG. 3, the pad 35 is a member that is detachably attached to a center of a surface (surface facing the forehead HD1) of the main section 3 on the side in the −Z direction. The pad 35 comes into contact with the forehead HD1 when the virtual image display device 1 is mounted and thereby pinches the head HD with the band section 4.

Such a pad 35 is an elastic member having an arc shape along the surface and is configured of rubber, synthetic resin, or the like in the embodiment. An inside of the pad 35 is hollow and the pad 35 is configured to be appropriately elastically deformable. In addition, the pad 35 is detachably attached to the surface of the main section 3 on the forehead HD1 side.

Moreover, as such a pad 35, a plurality types of pads of which dimensions (width dimensions) in the +X direction and dimensions (thickness dimensions) in the +Z direction are different are prepared. The user US selects the pad 35 that is suitable for shape and the size of the head HD of himself or herself and attaches the selected pad 35 to the main section 3. Therefore, it is possible to further improve wearability of the virtual image display device 1.

In such a plurality types of pads 35, a pad in which surface processing is executed on a surface facing the head HD (forehead HD1) such that a liquid such as sweat easily flows through is included and a pad in which holes are formed in the surface and a water absorbing member is disposed in the inner space is further included. The mounted virtual image display device 1 is suppressed to be displaced by the liquid such as sweat and further it is possible to reduce discomfort due to the interposed liquid by using the pads.

Configuration of Image Display Section

Figure 6:
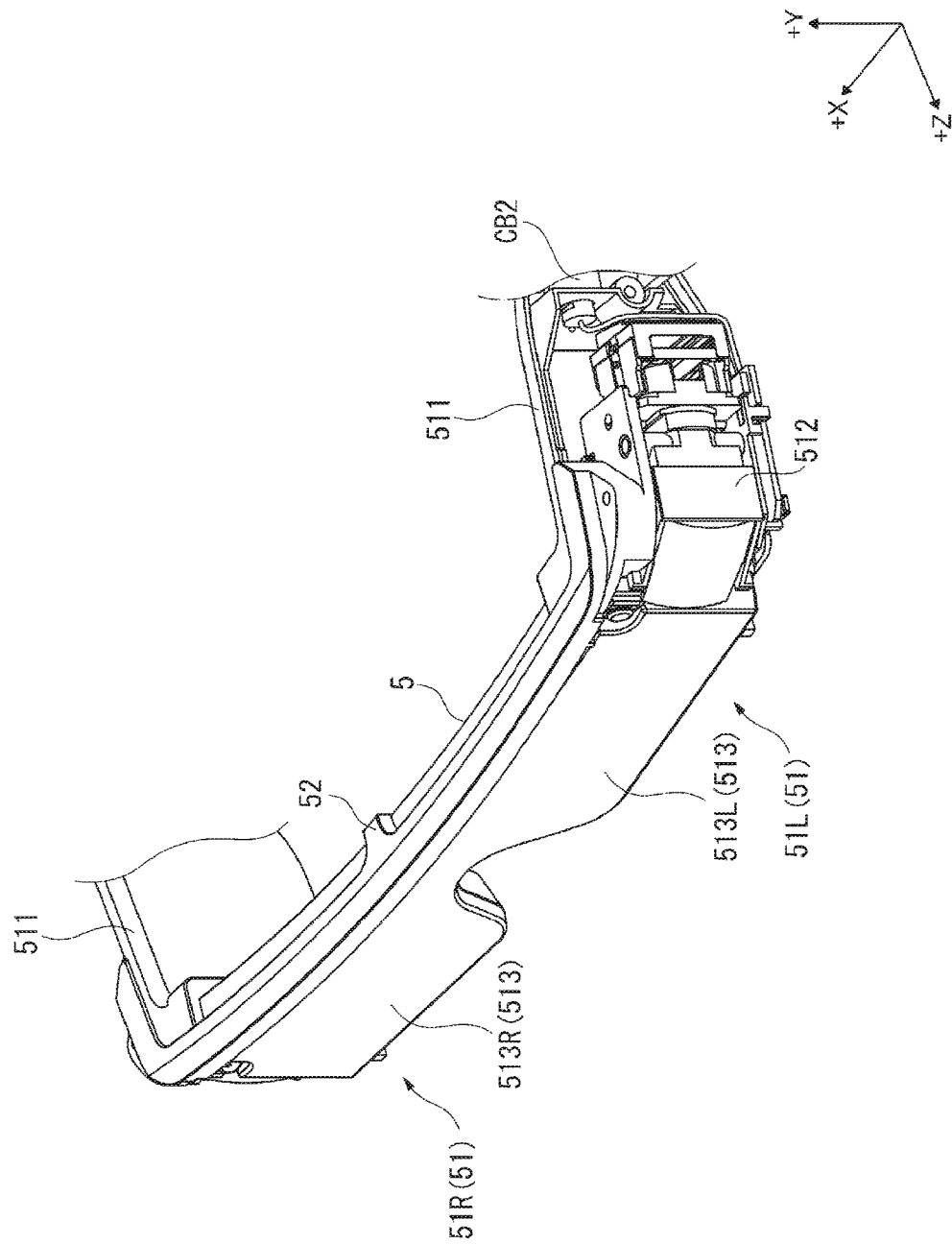
FIG. 6 is a perspective view illustrating a configuration of an image display section in the embodiment.

FIG. 6 is a view illustrating the inside of the image display device 51 except for a part of a cover member 511.

The image display section 5 forms an image corresponding to image information that is input from the control section 33 (see FIG. 4) and causes the user US to visually recognize the image as a virtual image. As illustrated in FIG. 6, the image display section 5 includes a pair of image display devices 51 (left eye image display device and right eye image display device are respectively referred to as 51L and 51R) which are disposed respectively to the right eye and the left eye of the user US, and a substantially U-shaped frame section 52 that holds the pair of image display devices 51.

Among the pair of image display devices 51, the left eye image display device 51L that is positioned on the side in the −X direction corresponds to a left side display section according to the invention and the right eye image display device 51R that is positioned on the side in the X direction corresponds to the right side display section according to the invention. Moreover, arrangements of each configuration of the left eye image display device 51L and the right eye image display device 51R have a mirror symmetrical relationship to each other. That is, the image display sections 5 have the left eye image display device 51L and the right eye image display device 51R which are respectively provided corresponding to the left eye and the right eye of the user US, and respectively display images which are capable of being observed by the user US.

As illustrated in FIG. 6, each of the pair of image display devices 51 has the cover member 511, an optical unit 512, a light guide member 513, and an engaging section 514 (see FIG. 7).

The cover member 511 corresponds to the frame according to the invention and is a housing that houses the optical unit 512 on an inside thereof. The cover member 511 has a waterproof structure (not illustrated) for preventing the fluid from entering the optical unit 512. Therefore, even if the image display device 51 is flipped up by rotating the pair of arms 6 outdoors, waterproof property of the entire virtual image display device 1 can be maintained.

The optical unit 512 is disposed on the inside of the cover member 511, modulates light incident from a light source device to an image light in accordance with the input image information using an optical modulation device, and emits the image light to the corresponding light guide member 513. Moreover, as the optical modulation device, for example, a device using a liquid crystal panel and a micro mirror such as Micro Electro Mechanical System (MEMS) mirror can be employed.

The light guide members 513 (right eye light guide member and left eye light guide member are respectively referred to as 513R and 513L) are disposed at positions corresponding to the eyes of the user US. The light guide member 513 has a semi-transmissive layer (semi-reflective layer) on an inside thereof and is configured to be capable of observing the outside via the semi-transmissive layer. In addition, an image light that is output from the optical unit 512 and is reflected on the semi-transmissive layer is incident on the eyes and thereby a virtual image is viewed. Such a light guide member 513 is mainly formed of resin (for example, cycloolefin polymer) exhibiting high optical transparency in a visible light region.

The engaging section 514 is provided on a base end portion of the cover member 511, is engaged with a second extending section 64 described below, and has a function of slidably fixing the second extending section 64 to the main section 3 in a direction in which the second extending section 64 moves toward or away from the main section 3 (see FIG. 7). The engaging section 514 configures a slide device 65 according to the invention together with second extending sections 64L and 64R (fixing sections 643L and 643R) which are described below.

The frame section 52 maintains the pair of image display devices 51 on the side in the +Y direction. The left eye image display device 51L is fixed on the side in the −X direction and the right eye image display device 51R is fixed on the side in the +X direction of the frame section 52.

As illustrated in FIG. 6, the left eye image display device 51L and the right eye image display device 51R are connected to the cable CB2 outputting the image information (image signal) to each optical unit 512 and the cable CB2 extends outside the cover member 511 and then is inserted into the main section 3, and is connected to the control section 33.

Configuration of Arm

Figure 8:
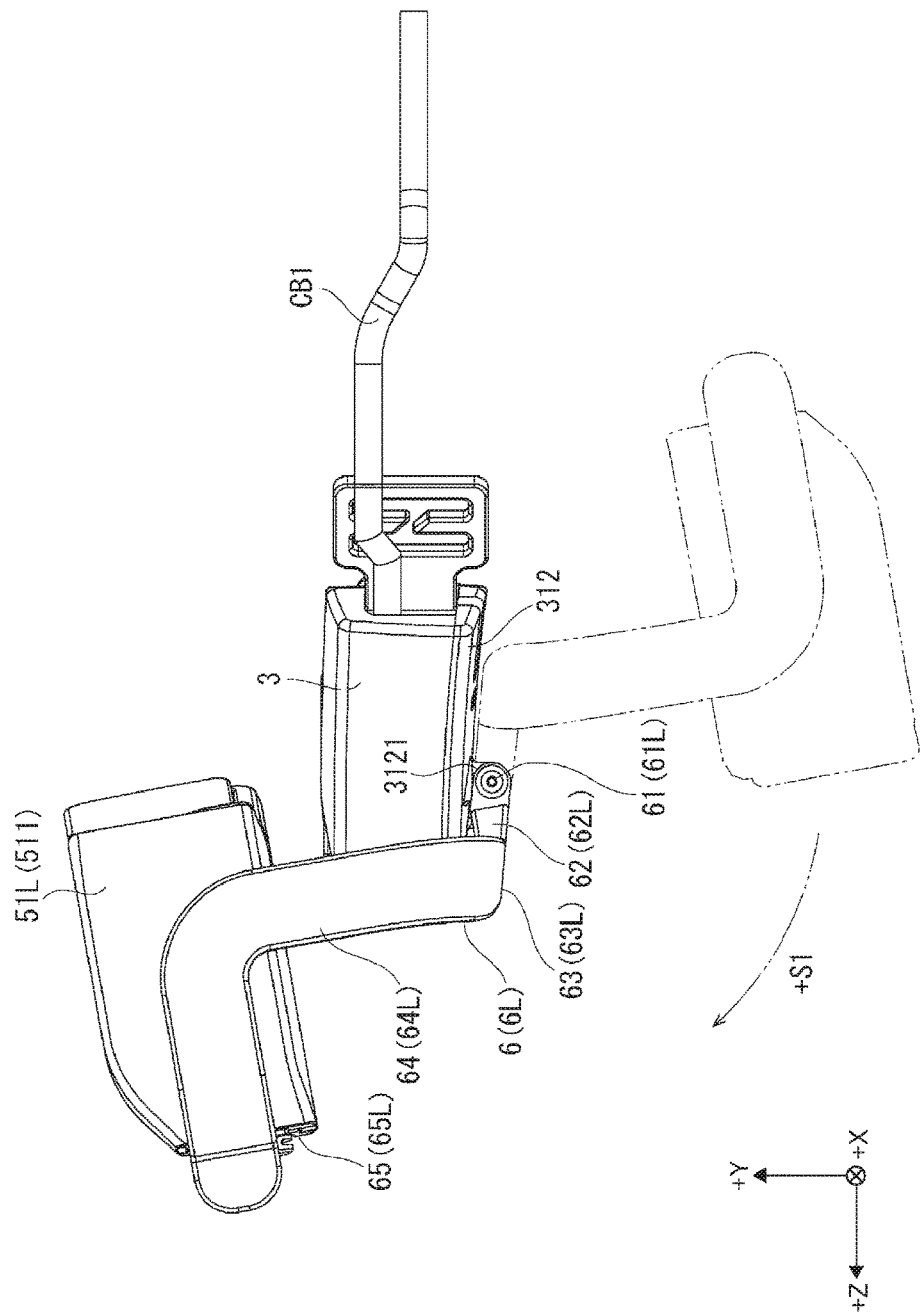
FIG. 8 is a side view illustrating the virtual image display device in a state where the arms are flipped up in the embodiment.
Figure 9:
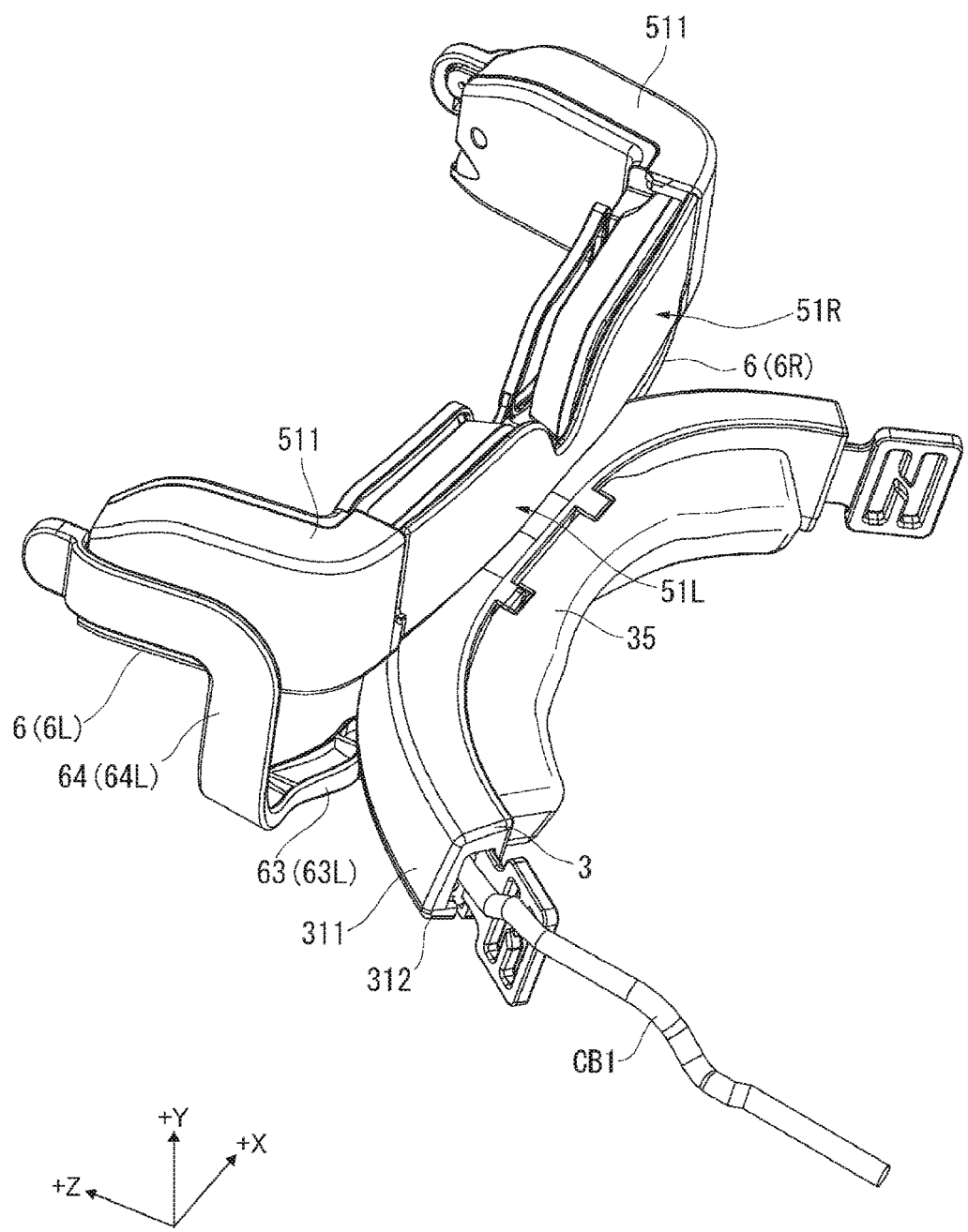
FIG. 9 is a perspective view illustrating the virtual image display device in a state where the arms are flipped up in the embodiment.

FIG. 7 is a front view of the virtual image display device 1 in a state where the arms 6 are flipped up on the side in the +Y direction, FIG. 8 is a side view of the virtual image display device 1 in a state where the arms 6 are flipped up on the side in the +Y direction, and FIG. 9 is a perspective view of the virtual image display device 1 in a state where the arms 6 are flipped up on the side in the +Y direction.

The pair of arms 6 are respectively positioned in the lower case 312 that is a portion of the main section 3 on the front surface side, are rotatably supported about the rotational shaft along a parallel direction (+X direction) that is a direction in which the left eye image display device 51L and the right eye image display device 51R are arranged, and has a function of supporting the image display section 5. Moreover, a portion on the front side of the main section 3 is in a range which is viewed from the side in the +Z direction. specifically, the portion on the front side is in a range on the side in the +X direction from the end portion of the left eye image display device 51L in the −X direction and on side in the −X direction from the end portion of the right eye image display device 51R in the +X direction in the main section 3.

As illustrated in FIGS. 7 to 9, the pair of arms 6 connect the main section 3 of the headband section 2 to the cover member 511 of the image display section 5 and are rotatably pivoted with respect to the lower case 312 of the main section 3.

In addition, the pair of arms 6 includes a left side arm 6L that is connected to the left eye image display device 51L and a right side arm 6R that is connected to the right eye image display device 51R. The left side arm 6L and the right side arm 6R have a mirror symmetrical relationship to each other in arrangements of each configuration.

Each of the pair of arms 6 includes the shaft section 61, a connecting section 62, a first extending section 63, the second extending section 64, and the slide device 65.

The shaft section 61 (shaft sections of the left side arm 6L and the right side arm 6R are respectively referred to as a left side shaft section 61L and a right side shaft section 61R) is a member that is rotatably supported in a state of exposing to the outside of the main section 3. As illustrated in FIGS. 7 to 9, the shaft section 61 is rotatably supported on the support section 3126 in the lower case 312 of the main section 3. The support sections 3126 are provided at an outer periphery of the main section 3 (lower case 312) and are positioned inside the both end portions of the main section 3 when viewed from the side in the +Z direction. More particularly, the support sections 3126 are positioned in a range on the side in the +X direction from the end portion of the left eye image display device 51L in the −X direction and on the side in the −X direction from the end portion of the right eye image display device 51R in the +X direction in the main section 3. In the embodiment, the support sections 3126 are positioned on an upper side in the vertical direction with respect to eyeballs of the user facing the left eye image display device 51L and the right eye image display device 51R.

Therefore, the shaft sections 61 supported by the support sections 3126 are also provided at the outer periphery of the main section 3 (lower case 312) and are positioned inside the both end portions of the main section 3 when viewed from the side in the +Z direction. In addition, each of the shaft sections 61 is supported on the support section 3126 aligned in a direction along the +X direction. Therefore, the shaft section 61 is supported in an arc shape which is rotatably about the shaft section 61 when viewing the virtual image display device 1 from the side in the −X direction. That is, the shaft sections 61L and 61R are separately supported by two support sections 3126 of the lower case 312.

As illustrated in FIGS. 7 and 8, the connecting section 62 (connecting sections of the left side arm 6L and the right side arm 6R are respectively referred to as a left side connecting section 62L and a right side connecting section 62R) is a portion that extends from the shaft section 61 and is connected to each of the pair of arms 6. The connecting section 62 is positioned in the vicinity of the shaft section 61, abuts against the main section 3, and has a function of regulating the rotation thereof from an observation position in which images displayed by the left eye image display device 51L and the right eye image display device 51R are capable of being observed at the user US side. Specifically, as illustrated in FIG. 1 and a broken line of FIG. 8, in each of the connecting sections 62, the surface of the connecting section 62 on the user US side abuts against the lower case 312 configuring the main section 3 and thereby the movement of the connecting section 62 in the +Y direction is regulated and accordingly, the movement of the left eye image display device 51L and the right eye image display device 51R toward the user US side is regulated. That is, the connecting section functions as the regulation section according to the invention.

In addition, the connecting section 62 has a shape extending in the −Z direction in a position (FIG. 1) in which the image display device 51 is viewed and a shape extending in the +Z direction in a position (FIG. 8) in which the image display device 51 is retreated. In addition, a dimension of the connecting section 62 extending from the shaft section 61 in the −Z direction is greater than a dimension from the shaft section 61 to the end portion of the main section 3 on the side in the +Z direction. Therefore, the connecting section 62 abuts against the lower case 312 when moving to a position in which the left eye image display device 51L and the right eye image display device 51R are not viewed. Therefore, the movement of the pair of arms 6 in a +S1 direction is regulated more than necessary.

Configuration of First Left Side Extending Section and Second Left Side Extending Section As illustrated in FIG. 7, the first extending sections 63 include a first left side extending section 63L configuring the left side arm 6L and a first right side extending section 63R configuring the right side arm 6R. The first left side extending section 63L extends from the left side connecting section 62L (left side shaft section 61L) toward the side (side in the −X direction) in a direction opposite to the right side arm 6R along the parallel direction (+X direction). Specifically, the first left side extending section 63L extends from the support section 3126 of the lower case 312 to the vicinity of the end portion of the lower case 312 on the side in the −X direction along the bottom surface 312A of the lower case 312. The first left side extending section 63L is connected to a second left side extending section 64L.

The second left side extending section 64L is bent at a tip of the first left side extending section 63L in the extending direction and is connected to the end portion of the cover member 511 of the left eye image display device 51L on the left side (side in the −X direction). Such a second left side extending section 64L has a bent section 641L, an L-shaped section 642L, and a fixing section 643L. Among them, the bent section 641L is connected to a tip of the first left side extending section 63L in the −X direction and is bent on the left eye image display device 51L side (side in the +Y direction in FIGS. 7 to 9). The tip of the bent section 641L is positioned on the side in the −X direction from the lower case 312 of the main section 3 and is positioned on the side in the −X direction from a side surface of the left eye image display device 51L on the side in the −X direction.

The L-shaped section 642L extends from the tip of the bent section 641L toward the left eye image display device 51L. Specifically, the L-shaped section 642L has a shape that extends to a side surface (surface on the side in the −X direction) in the cover member 511 of the left eye image display device 51L and extends from the position toward the base end portion (end portion on the side in the +Z direction in FIGS. 7 to 9) of the cover member 511.

The fixing section 643L is connected to the tip of the L-shaped section 642L and is slidably fixed to the base end portion in the cover member 511 from the outside (side in the −X direction) of the cover member 511. The fixing section 643L configures a left side slide device 65L together with the engaging section 514 provided in the left eye image display device 51L.

Configuration of First Right Side Extending Section and Second Right Side Extending Section The first right side extending section 63R extends from the right side connecting section 62R (right side shaft section 61R) to the side (side in the +X direction) in a direction opposite to the left side arm 6L along the parallel direction (+X direction). Specifically, the first right side extending section 63R extends from the support section 3126 of the lower case 312 to the vicinity of the end portion of the lower case 312 on the side in the +X direction along the bottom surface 312A of the lower case 312. The first right side extending section 63R is connected to a second right side extending section 64R.

The second right side extending section 64R is bent at a tip of the first right side extending section 63R in the extending direction and is connected to an end portion of the right eye image display device 51R on the right side (side in the +X direction) in the cover member 511. Such a second right side extending section 64R has a bent section 641R, an L-shaped section 642R, and a fixing section 643R. Among them, the bent section 641R is connected to a tip of the first right side extending section 63R in the +X direction and is bent on the right eye image display device 51R side (side in the +Y direction in FIGS. 7 to 9). The tip of the bent section 641R is positioned on the side in the +X direction from the lower case 312 of the main section 3 and is positioned on the side in the +X direction by the side surface of the right eye image display device 51R on the side in the +X direction.

The L-shaped section 642R extends from the tip of the bent section 641R toward the right eye image display device 51R. Specifically, the L-shaped section 642R has a shape extending to the side surface (surface on the side in the +X direction) of the right eye image display device 51R in the cover member 511 and extending from the position toward the base end portion (end portion on the side in the +Z direction in FIGS. 7 to 9) of the cover member 511.

The fixing section 643R is connected to the tip of the L-shaped section 642R and is slidably fixed to the base end portion in the cover member 511 from the outside (side in the +X direction) of the cover member 511. The fixing section 643R configures a right side slide device 65R together with the engaging section 514 which is provided in the right eye image display device 51R.

Configuration of Slide Device

One of each of the pair of arms 6 and the image display device 51 includes the slide device 65 that slidably connects the image display device 51 to the other in a direction in which the image display device 51 moves toward and away from the headband section 2 (main section 3). Such the slide devices 65 include the left side slide device 65L for the left side arm 6L and the right side slide device 65R for the right side arm 6R.

The left side slide device 65L is configured of the fixing section 643L of the second left side extending section 64L and the engaging section 514 with which the fixing section 643L is engaged. Among them, a recessed portion (not illustrated) is formed on a surface of the fixing section 643L on the side in the +X direction. In addition, as illustrated in FIG. 7, the engaging section 514 that is disposed in the cover member 511 includes protrusions 5141 and 5142 formed in a line in the +Y direction (moving direction toward and away from the main section 3) in FIG. 7.

The protrusion 5141 is positioned on the side in the −Y direction (moving direction toward the main section 3) from the protrusion 5142. The engaging section 514 is fixed by engaging the recessed portion with one of the protrusions 5141 and 5142. That is, the second left side extending section 64L and accordingly, the left eye image display device 51L can be slid in the moving direction toward and away from the main section 3 and it is possible to adjust a distance between the headband section 2 (main section 3) and the left eye image display device 51L by engaging the recessed portion with one of the protrusions 5141 and 5142.

The right side slide device 65R is configured of the fixing section 643R of the second right side extending section 64R and the engaging section 514 with which the fixing section 643R is engaged. Among them, a recessed portion (not illustrated) is formed on a surface of the fixing section 643R on the side in the −X direction. In addition, the engaging section 514 that is disposed in the cover member 511 includes protrusions 5141 and 5142 that are formed in a line in the +Y direction (moving direction toward and away from the main section 3) in FIG. 7.

The protrusion 5141 is positioned on the side in the −Y direction (moving direction toward the main section 3) from the protrusion 5142. The engaging section 514 is fixed by engaging the recessed portion with one of the protrusions 5141 and 5142. That is, the second right side extending section 64R and accordingly, the right eye image display device 51R can be slid in the moving direction toward and away from the main section 3 and it is possible to adjust a distance between the headband section 2 (main section 3) and the right eye image display device 51R by engaging the recessed portion with one of the protrusions 5141 and 5142.

The pair of arms 6 includes the configuration described above and thereby it is possible to move the image display device 51 to each position of the observation position in which the image display device 51 is positioned in front of the left eye and the right eye of the user US and the retreat position in which the image display device 51 is retreated from in front of the left eye and the right eye.

For example, in a case where the user US visually recognizes the image display device 51, as illustrated in FIG. 1, the pair of arms 6 are moved and the image display device 51 is positioned on the front of the left eye and the right eye of the user US.

Meanwhile, in a case where the user US does not visually recognize the image display device 51, as illustrated in FIG. 8, the pair of arms 6 and the image display device 51 that are positioned at the observation position indicated by the broken line in FIG. 8 are moved in the +S1 direction about the shaft section 61 and are fixed to the position illustrated in FIG. 8. Therefore, since the image display device 51 is not positioned on the front of the left eye and the right eye of the user US, it is possible to execute the non-visual operation, which is performed without visually recognizing the image display device 51, can be executed without removing the virtual image display device 1 from the head HD.

Mounting State of Virtual Image Display Device on Helmet

Figure 10:
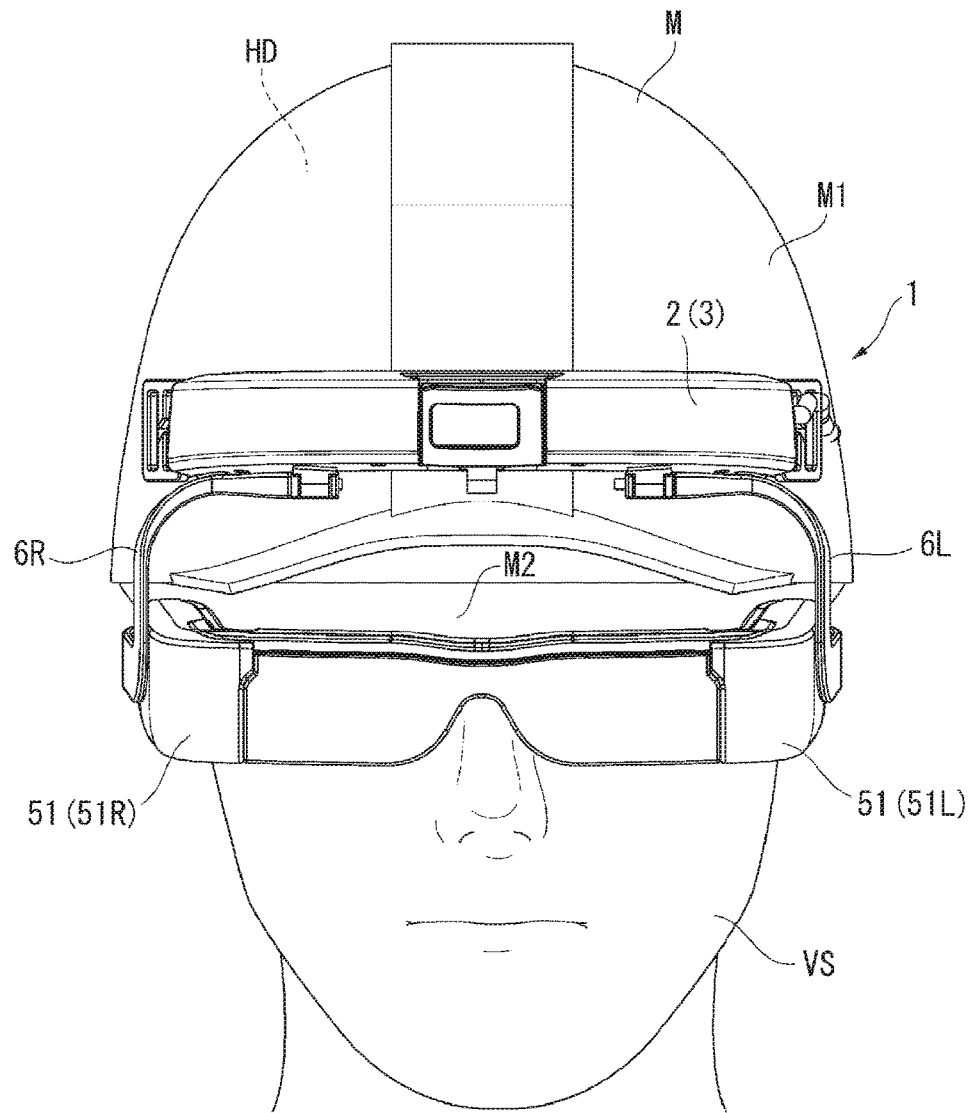
FIG. 10 is a front view illustrating a state where the virtual image display device is mounted on a helmet in the embodiment.
Figure 11:
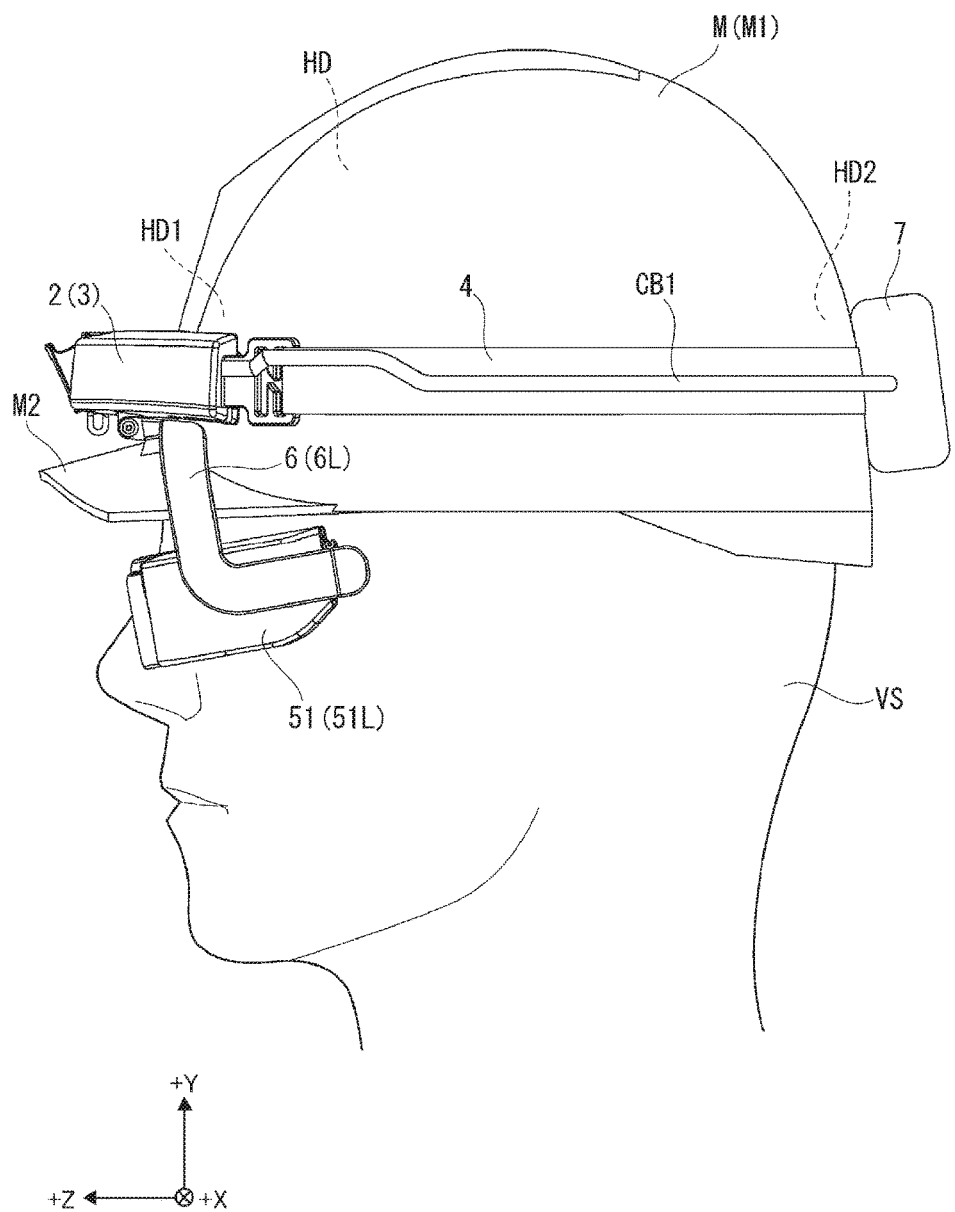
FIG. 11 is a side view illustrating a state where the virtual image display device is mounted on the helmet in the embodiment.

FIG. 10 is a front view illustrating a state where the virtual image display device 1 is mounted on the helmet M and FIG. 11 is a side view illustrating a state where the virtual image display device 1 is mounted on the helmet M.

As illustrated in FIGS. 10 and 11, the user US wears the helmet M as the covering member for protecting the head HD of the user US. The helmet M includes a covering portion M1 for covering the head HD and a flange portion M2 extending from an end portion of the covering portion M1 on the side in the +Z direction in the +Z direction.

As illustrated in FIGS. 10 and 11, the virtual image display device 1 is mounted on the covering portion M1 of the helmet M. Specifically, the virtual image display device 1 is used by being mounted on a mounting portion (particularly, a position corresponding to the position described above of the head HD including the forehead HD1 and the back head HD2) of the covering portion M1.

As illustrated in FIGS. 10 and 11, the main section 3 is disposed at a portion corresponding to the forehead HD1 of the head HD in the covering portion M1. In addition, the band section 4 is connected to the connecting section 34 of the main section 3 and is disposed so as to surround to the head HD of the user US in the covering portion M1. Therefore, the main section 3 and accordingly the headband section 2 are mounted on positions corresponding to the head HD of the user US in the covering portion M1 of the helmet M.

In addition, the controller 7 is housed in a case (not illustrated) attached to the band section 4 and is fixed to a position corresponding to the back head HD2 of the covering portion M1.

Figure 12:
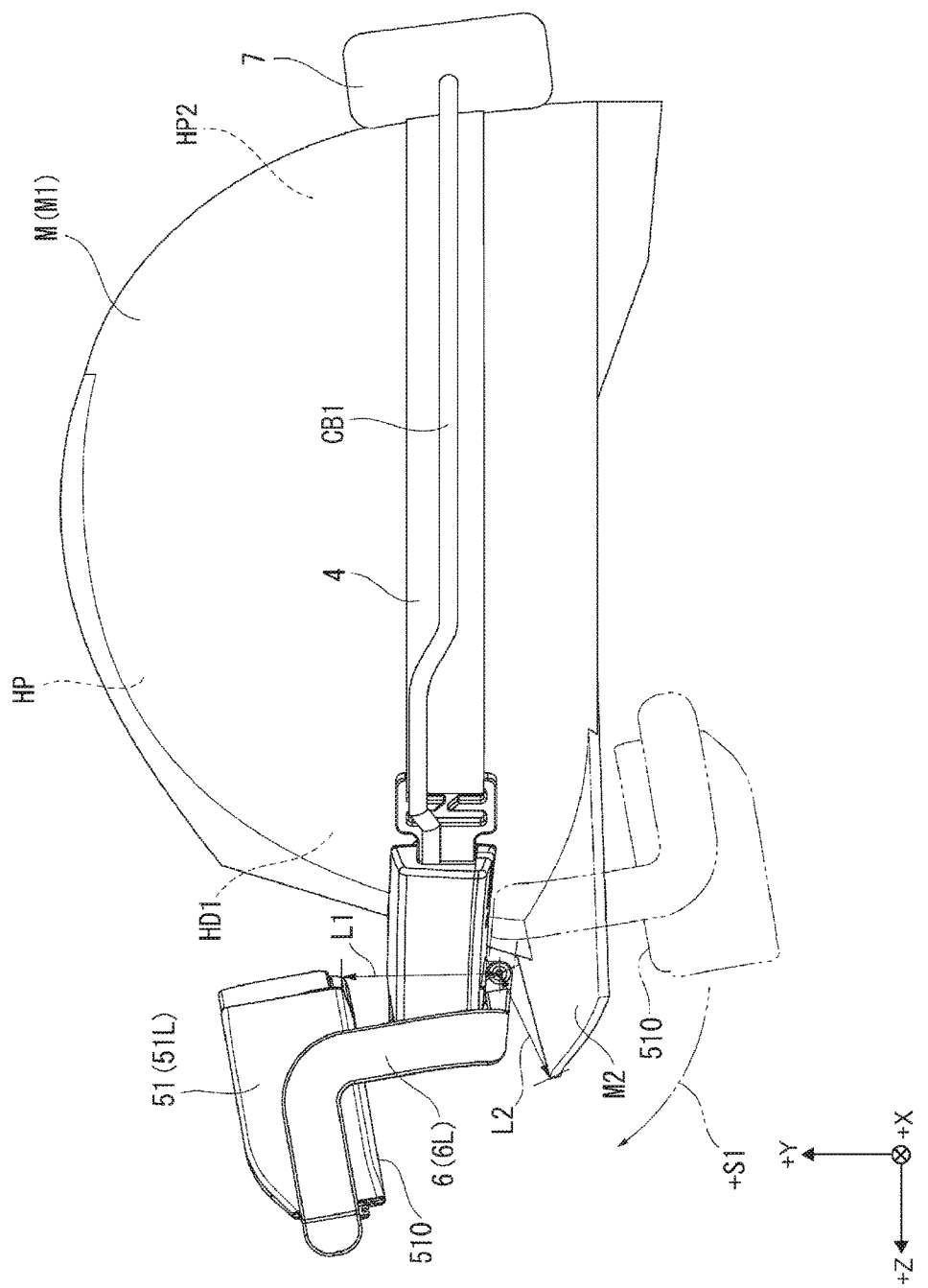
FIG. 12 is a side view illustrating a state where the arms of the virtual image display device are flipped up in the embodiment.

FIG. 12 is a side view illustrating a state where the arms 6 of the virtual image display device 1 mounted on the helmet M are flipped up.

For example, in a case where the user US visually recognizes the image display device 51, as illustrated in FIGS. 10 and 11, the pair of arms 6 are moved and the image display device 51 is positioned in front of the left eye and the right eye of the user US.

Meanwhile, in a case where the user US does not visually recognize the image display device 51, as illustrated in FIG. 12, the pair of arms 6 and the image display device 51, which are positioned at the observation position indicated by a broken line in FIG. 12, are rotated in the +S1 direction about the shaft section 61 and are fixed to a position illustrated in FIG. 12.

Here, in a case where the helmet M on which the virtual image display device 1 is mounted is viewed from the side in the +X direction, a length L1 of a first perpendicular line extending from a virtual line through the center of the shaft section 61 and along the parallel direction (+X direction) to an upper surface 510 (surface on the side in the −Y direction in FIG. 12) of the image display device 51 is greater than a length L2 of a second perpendicular line extending from the virtual line to the foremost end (portion that is the farthest from the user US) of the flange portion M2. Moreover, in a case where the upper surface of the image display device 51 is bent, a length that is obtained by being extended by the bending may be added to the length L1.

The pair of arms 6 do not come into contact with the flange portion M2 of the helmet M and are moved to the position illustrated in FIG. 12 by the configuration described above. Therefore, since the image display device 51 is not positioned in front of the left eye and the right eye of the user US, it is possible to execute the non-visual operation, which is performed without visually recognizing the image display device 51, without removing the virtual image display device 1 from the helmet M.

Advantages of Embodiment

The virtual image display device 1 according to the embodiment described above achieves the following advantages.

The pair of arms 6, which support the left eye image display device 51L and the right eye image display device 51R respectively provided corresponding to the left eye and the right eye of the user US, are rotatably configured about the rotational shaft along the parallel direction (+X direction) in which the left eye image display device 51L and the right eye image display device 51R are arranged. Therefore, the pair of arms 6 rotate along the rotational shaft and thereby it is possible to move the image display device 51 in the direction away from in front of the eyes of the user US. Therefore, since the pair of arms 6 rotate about the rotational shaft, when executing the non-visual operation, it is possible to retreat the image display device 51 from in front of the eyes without removing the virtual image display device 1 from the head HD of the user US or the position corresponding to the head HD. That is, it is possible to increase the retreat amount of the image display device 51. Therefore, in a case where the user US executes the visual operation in which the image display device 51 is viewed and even in a case where the user US executes the non-visual operations in which the image display device 51 is not viewed, since labor of removing the virtual image display device 1 can be omitted, it is possible to improve the efficiency of the operation.

In addition, the shaft section 61 is provided at the outer periphery of the main section 3 and is positioned inside from the both end portions of the main section 3 when viewed from the +Z direction. Therefore, in a case where the flange portion M2 is provided in the helmet M, it is possible to provide the shaft section 61 without extending the main section 3 on the both end sides in the direction along the +X direction in order to retreat the flange portion M2 of the helmet M in accordance with the shape of the head HD of the user US or the helmet M.

Since the pair of arms 6 include the shaft sections 61 that are rotatably supported on the main section 3 of the headband section 2, it is possible to increase the retreat amount of the pair of arms 6. In addition, since the connecting section 62 as the regulation section, which regulates the rotation of the image displayed by the left eye image display device 51L and the right eye image display device 51R from the observation position in which the image is capable of being observed at the user US side, is provided, it is possible to prevent the image displayed by the left eye image display device 51L and the right eye image display device 51R from being not observed when the image display device 51 is too close to the user US.

Since the shaft section 61 is supported on the bottom portion of the lower case 312 of the main section 3, it is possible to stably hold the image display device 51 that is supported by the arms 6, for example, compared to a case where the shaft section 61 is supported on the surface of the main section 3 on the side (+Z direction) opposite to the user US.

In addition, since the shaft section 61 is positioned on the bottom portion of the lower case 312 of the main section 3, it is possible to reduce the rotation range of the arm 6, for example, compared to a case where the shaft section 61 is positioned on the upper surface 510 of the upper case 311 of the main section 3 on the +Y direction. Therefore, it is possible to decrease the size of the virtual image display device 1.

Since each of the left side arm 6L and the right side arm 6R includes the left side shaft section 61L and the right side shaft section 61R, it is possible to reliably rotate the left eye image display device 51L and the right eye image display device 51R respectively supported on the left side arm 6L and the right side arm 6R, for example, compared to a case where each of the left side arm 6L and the right side arm 6R includes one shaft section. In addition, the second left side extending section 64L is connected to the left side end portion in the left eye image display device 51L, that is, the end portion on the side opposite to the user US, and the second right side extending section 64R is connected to the right side end portion in the right eye image display device 51R, that is, the end portion on the side opposite to the user US. Therefore, it is possible to stably hold the left eye image display device 51L and the right eye image display device 51R compared to a case where the second left side extending section 64L and the second right side extending section 64R are connected to the end portions of the left eye image display device 51L and the right eye image display device 51R on the user US side.

In addition, when the user US wears the covering member such as the helmet M on the head HD, if the second left side extending section 64L and the second right side extending section 64R are connected to the end portions of the left eye image display device 51L and the right eye image display device 51R on the user US side, the second left side extending section 64L and the second right side extending section 64R come into contact with the flange portion M2 of the helmet M, and each of the left eye image display device 51L and the right eye image display device 51R may not be retreated from in front of the eyes of the user US.

In contrast, in the embodiment, the second left side extending section 64L and the second right side extending section 64R are connected to the end portions of the left eye image display device 51L and the right eye image display device 51R on the side opposite to the user US. Therefore, since the second left side extending section 64L and the second right side extending section 64R do not come into contact with the flange portion M2, it is possible to cause each of the left eye image display device 51L and the right eye image display device 51R to retreat from in front of the eyes of the user US.

Since the image display device 51 is configured to be slidably in the direction in which the image display device 51 moves toward and away from the main section 3 of the headband section 2, it is possible to adjust the distance between the main section 3 and the image display device 51. Therefore, since the position of the image display device 51 can be adjusted in accordance with the position of the eyes of the user US, it is possible to improve convenience and versatility of the virtual image display device 1.

Since the main section 3 is disposed at the position corresponding to the forehead HD1 and the band section 4 is disposed at the position corresponding to the back head HD2, it is possible to pinch the forehead HD1 and the back head HD2 (positions corresponding to the forehead HD1 and the back head HD2) by each of the main section 3 and the band section 4 during mounting the virtual image display device 1. Therefore, it is possible to reliably mount (fix) the virtual image display device 1 on the head HD of the user US.

For example, in a case where the pad 35 connected to the main section 3 on the forehead HD1 side is formed of a relatively stiff member, since the pad 35 is not elastically deformed, a mounting feeling of the virtual image display device 1 may be deteriorated.

In contrast, in the embodiment, since the pad 35 is formed of the elastic member such as rubber or synthetic resin, the pad 35 is elastically deformed and thereby it is possible to improve wearing feeling of the virtual image display device 1. In addition, since the band section 4 is also formed of an elastic member, similar to the pad 35 described above, when mounting the virtual image display device 1, the pad 35 and the band section 4 are elastically deformed. Therefore, it is possible to pinch the forehead HD1 and the back head HD2 while applying an appropriate pressure to the forehead HD1 and the back head HD2 of the user US (positions corresponding to the forehead HD1 and the back head HD2, respectively). Therefore, it is possible to further improve wearability of The virtual image display device 1.

Since the control substrate 331 is covered by the inner case 332, for example, even in a case where an impact is applied to the main section 3, it is possible to alleviate stress acting on the control substrate 331 by the impact by the inner case 332. Therefore, it is possible to improve impact resistance with respect to the control substrate 331 and to stably operate the virtual image display device 1.

Here, when using the virtual image display device 1 outdoors, possibility that dust and water enter the inside of the main section 3 is increased compared to a case where the virtual image display device 1 is used indoors.

In contrast, in the embodiment, since the openings 3121 as discharge openings, which discharge the fluid such as water passing through the inner walls 3123 as the ribs extending from the outer edge of the inner case 332 toward the both ends of the lower case 312 of the outer case 31 in the main section 3 to the outside of the main section 3 (outer case 31), is provided, it is possible to discharge dust and water entering the inside of the main section 3 to the outside of the main section 3. Therefore, it is possible to prevent the control substrate 331 and the like disposed in the main section 3 from being damaged by the fluid flowing into the main section 3.

Even in the case where the virtual image display device 1 is mounted on the covering portion M1 of the helmet M that is mounted on the head HD of the user US and protects the head HD of the user US, in the embodiment, when the pair of arms 6 are rotated in the +S1 direction, the pair of arms 6 do not abut against the flange portion M2 of the helmet M. Therefore, the user US can move the image display device 51 in the virtual image display device 1 mounted on the helmet M from in front of the eyes in accordance with an operation executed by the user US.

Therefore, since there is no need to remove the virtual image display device 1 from the helmet M in accordance with each of the visual operation and the non-visual operation, it is possible to improve operation efficiency of the user US. In addition, there is no need for the user US to feel troublesome in removing the virtual image display device 1, remove the helmet M on which the virtual image display device 1 is mounted, and then execute the non-visual operation. Therefore, it is possible to improve safety of the user US.

When viewing the helmet M on which the virtual image display device 1 is mounted from the side of +X direction, the length L1 of the first perpendicular line extending from the virtual line to the upper surface 510 (surface on the side in the −Y direction in FIG. 12) of the image display device 51 through the center of the shaft section 61 and along the parallel direction (+X direction) is greater than the length L2 of the second perpendicular line extending from the virtual line to the foremost end of the flange portion M2. Therefore, when rotating the pair of arms 6, it is possible to reliably prevent the image display device 51 from coming into contact with the flange portion M2. Therefore, it is possible to reliably retreat the image display device 51 and it is possible to prevent the image display device 51, accordingly, the virtual image display device 1 from being damaged.

Modifications of Embodiment

The invention is not limited to the embodiment described above and deformations, improvements, and the like are included in the invention in a range capable of achieving the object of the invention.

In the embodiment described above, the connecting section 62 as the regulation section is provided and the surface of the connecting section 62 on the user US side abuts against the bottom portion of the lower case 312. Therefore, the rotation of the image display device 51 is regulated on the user US side from the observation position in which the image displayed by the image display device 51 is capable of being observed. However, the invention is not limited to the embodiment. For example, the connecting section 62 that functions as the regulation section may be omitted. In this case, the first extending section 63 may be connected to the shaft section 61. In this case, the first extending section functions as the regulation section. In addition, a separate structure, which regulates the rotation of the image display device 51 on the user US side from the observation position in which the image displayed by the image display device 51 is capable of being obtained, may be provided.

In the embodiment described above, the shaft sections 61 (left side shaft section 61L and the right side shaft section 61R) are respectively supported by the support section 3126 that is formed in the bottom portion (surface on the side in the −Y direction) of the lower case 312 of the main section 3. However, the invention is not limited to the embodiment. For example, the support section 3126 may be provided on the surface of the upper case 311 on the side in the +Z direction and the shaft section 61 may be provided on the surface. Also in this case, it is possible to achieve substantially the same advantages as those of the embodiment described above.

In the embodiment described above, the left side shaft section 61L and the right side shaft section 61R are provided. However, the invention is not limited to the embodiment. For example, each of the left side arm 6L and the right side arm 6R may be connected to one shaft section. In this case, one shaft section may be provided substantially at the center of the surface of the lower case 312 on the side in the −Y direction.

In the embodiment described above, the second extending sections 64 (second left side extending section 64L and the second right side extending section 64R) have the bent sections 641L and 641R, the L-shaped sections 642L and 642R, and the fixing sections 643L and 643R. However, the invention is not limited to the embodiment. For example, the L-shaped sections 642L and 642R may not be the L-shape and may be a shape hanging from the tip of the bent section 641L in the −Y direction, and the tip of the shape may be slidably fixed to the outside of the image display devices 51L and 51R. In this case, the fixing sections 643L and 643R may be omitted.

In the embodiment described above, the engaging section 514 configuring the slide device 65 includes two protrusions 5141 and 5142. However, the invention is not limited to the embodiment. For example, the engaging section 514 may include three or more protrusions. In this case, since the recessed portion of the fixing sections 643L and 643R is engaged with any one of three or more protrusions, it is possible to finely adjust the distance between the headband section 2 (main section 3) and the image display device 51 more than the embodiment described above.

In addition, the engaging section 514 may have two or more recessed portions and the fixing sections 643L and 643R may have protrusions engaging with the recessed portions. Also, in this case, it is possible to achieve the same advantages as those of the embodiment described above.

Furthermore, the configuration of the slide device 65 is not limited to the configuration described above and may be any configuration as long as the positions of the fixing sections 643L and 643R can be fixed to a plurality of positions.

In the embodiment described above, the slide device 65 is provided. However, the invention is not limited to the embodiment. For example, the slide device 65 may be omitted.

In the embodiment described above, the control substrate 331 that is configured by mounting an electronic circuit on a substrate is provided. However, the invention is not limited to the embodiment. For example, a control section, which is configured by directly mounting an electronic component such as a control circuit on the inside of the inner case 332 without providing the substrate, may be employed.

In addition, as the control section in which each electronic component or a plurality of circuit substrate is configured by being connected by wiring, a control section having various wiring configurations such as a configuration in which wiring is directly formed an inner surface of a case such as the outer case 31 and the inner case 332, or an outer surface of the inner case 332, and a configuration (aerial wiring) in which wiring members such as wires are three-dimensionally disposed may be used. In addition, a control device, which is configured to be capable of communicating between a plurality of circuit substrates and electronic components by a wireless communication unit, may be used.

In the embodiment described above, two cases of the outer case 31 and the inner case 332 that is disposed on the inside of the outer case 31 and houses the control substrate 331 are provided, and the inner case 332 has the waterproof property. However, the invention is not limited to the embodiment and the outer case 31 may have the waterproof property. In this case, the inner case 332 may not have the waterproof property. However, if the inner case 332 has the waterproof property, it is possible to further reliably suppress deterioration of the control substrate 331.

In the embodiment described above, two cases of the outer case 31 and the inner case 332 that is disposed on the inside of the outer case 31 and houses the control substrate 331 are provided. However, the invention is not limited to the embodiment. For example, three or more cases may be provided.

In addition, cases having a plurality of different functions may be provided. For example, a configuration, in which a first inner case having the waterproof property is disposed on the inside of the outer case 31, a second inner case that functions as an electromagnetic shield is disposed on an inside of the first inner case, and at least a part of the control device (control substrate 331) is disposed on an inside of the second inner case, and the like may be employed.

In addition, the inner case 332, which is disposed on the inside of the outer case 31, may be visible from an gap of the outer case 31, and may be completely covered by the outer case 31.

In the embodiment described above, the inner case 332 has the waterproof property described above. However, the invention is not limited to the embodiment. For example, the inner case 332 may not have the waterproof property. Also, in such a configuration, it is possible to improve the impact resistance with respect to the control substrate 331 by housing the control substrate 331 in the inner case 332. Moreover, as in the embodiment described above, a configuration having high waterproof property in the outer case 31 does not need to be employed and it is possible to improve a degree of design freedom of the outer case 31 by providing the waterproof property in the inner case 332.

In the embodiment described above, the headband section 2 includes the main section 3 and the band section 4. However, the invention is not limited to the embodiment. For example, the main section 3 may be configured substantially in an arc shape mounted on the head HD of the user US.

In the embodiment described above, the pad 35 mounted on the main section 3 and the band section 4 are configured of the elastic member such as rubber and the synthetic resin. However, the invention is not limited to the embodiment. For example, at least one of the pad 35 and the band section 4 may not be configured of the elastic member.

In the embodiment described above, the band section 4 has a band shape and is disposed around the head HD including the back head HD2 of the user US. However, the invention is not limited to the embodiment. That is, the band section 4 is not particularly limited as long as the outer case 31 is configured to be disposed along the user US.

For example, in a case where the virtual image display device 1 is disposed along the head HD of the user US as a mounting portion, a configuration of a head cap type which is mounted by covering the head HD and an intersecting band type (cross-band type in a case where the bands are two) in which a plurality of bands intersect in the head top along the head HD may be employed.

In the embodiment described above, the outer case 31 of the main section 3 is formed substantially in the semicircular shape (substantially U-shape). However, the invention is not limited to the embodiment. That is, in a case where the head HD of the user US is the mounting portion, a configuration, in which the headband section 2 can be disposed along the head HD (portion along the +C direction about a center axis of the head HD and above a line through the both eyes), may be provided and, for example, a configuration, which has an arc-shaped inner surface along the forehead HD1 of the head HD in at least a part thereof, may be provided.

In the embodiment described above, the head HD of the user US is the mounting portion and the main section 3 configuring the headband section 2 is belt along the head HD (forehead HD1). However, the invention is not limited to the embodiment. For example, a portion such as a side portion of a face surface of the user US other than the head HD may be the mounting portion. In this case, a configuration, in which the outer case 31 of the main section corresponding to the headband section 2 has a shape along the mounting portion and can be disposed along the mounting portion, may be provided.

In the embodiment described above, the inner wall 3123 and the guide section 3124 are provided in the bottom surface 312A of the lower case 312, and the flow path P, which causes the liquid entering the inside the outer case 31 to flow through, is formed by the inner wall 3123 and the guide section 3124. However, the invention is not limited to the embodiment.

For example, the flow path P may discharge the liquid on the inside of the outer case 31 to the outside and a guide section may be provided at an any position on the inside of the outer case 31. In addition, the discharge opening (opening 3121) may also be provided at a position corresponding to the flow path P. In addition, only the discharge opening (opening 3121) may be provided without providing the guide section. Moreover, the flow path P or the discharge opening (opening 3121) may not be provided.

In the embodiment described above, the imaging section 32 is configured to be rotated about the rotational shaft parallel in the +X direction and to be capable of adjusting the imaging direction in one direction. However, the invention is not limited to the embodiment. That is, a configuration, in which the imaging direction is capable of adjusting in another direction, may be provided or the imaging direction may be fixed. In addition, the imaging section 32 may not be provided.

In the embodiment described above, the image display section 5 has each of the left eye image display device 51L and the right eye image display device 51R. However, the invention is not limited to the embodiment. For example, the image display section 5 may have only one of the left eye image display device 51L and the right eye image display device 51R. Moreover, also, in this case, the configuration of the shaft section 61 can be applied. If the length L1 of the first perpendicular line is set greater than the length L2 of the second perpendicular line, it is possible to reliably prevent the image display device 51 from coming into contact with the flange portion M2 when rotating the pair of arms 6.

In the embodiment described above, the shaft section 61 is supported on the bottom portion of the lower case 312 of the main section 3. However, the invention is not limited to the embodiment. For example, the shaft section 61 may be provided on the ceiling surface of the upper case 311 of the main section 3 and the surface of the upper case 311 on the side in the +Z direction. That is, the shaft section 61 may be provided on any surface as long as the surface is different from the surface facing the forehead HD1 in the main section 3.

In addition, the shaft section 61 may be provided, for example, on the inside of the main section 3. In this case, a notch in which the connecting section 62 extending from the shaft section 61 of the main section 3 is movable in the +S1 direction may be provided in the main section 3. In this case, it is possible to achieve the same advantages as those of the embodiment described above.

In the embodiment described above, the controller 7 receiving various input operations by the user US is connected to the virtual image display device 1 and a part of functions of the virtual image display device 1 is controlled by control section 33 in accordance with the input from the controller 7. However, the invention is not limited to the embodiment.

For example, in the configuration in which the controller 7 is connected to the virtual image display device 1, one of the virtual image display device 1 and the controller 7 has at least one of a function of acquiring operation information in accordance with the operation of the user US, a function of driving the image display device 51 in accordance with the image information by acquiring the image information, and a function of supplying power, and the other may have the remaining functions.

In addition, the virtual image display device 1 may be connected to an image supplying device (PC and the like) via the controller 7 or may be directly connected to the image supplying device without the controller 7. In such a configuration, the virtual image display device 1 is used as an image display portion in the image supplying device and various operations of the virtual image display device 1 may be controlled by the image supplying device. Moreover, in this case, the image supplying device may supply power for driving the virtual image display device 1.

Furthermore, a battery or a control device of an image processing device and the like may be disposed in the virtual image display device 1 (for example, the headband section 2 and the image display device 51). Furthermore, a slot of a memory card and the like may be provided. Furthermore, an operation section for receiving an operation of the user US may be provided in the virtual image display device 1 or a configuration that is capable of detecting a tapping operation may be provided. That is, the controller 7 may be omitted.

In the embodiment described above, the controller 7 is housed in the case (not illustrated) and is fixed to the back head HD2. However, the invention is not limited to the embodiment. The controller 7 may not be housed in the case (not illustrated) or may not be fixed to the back head HD2. For example, the controller 7 is housed in a case different from the case (not illustrated), may be mounted on an arm of the user US, or may be mounted on a waist (for example, a belt or the like) of the user US. That is, a fixing position of the controller 7 is not limited.

In the embodiment described above, as the covering member for protecting the head HD of the user US, the helmet M is exemplified. However, the invention is not limited to the embodiment. For example, the covering member is not only the helmet in which the flange portion M2 is provided but also may be a hat (cap) and the like in addition to a helmet in which the flange portion M2 is not provided. Also, in this case, it is possible to achieve the same advantages as those of the embodiment described above.

In the embodiment described above, as the head-mounted type image display device of the invention, the see-through virtual image display device 1 is exemplified. However, the invention is not limited to the embodiment. For example, the head-mounted type image display device may be a so-called closed display device. In addition, the displayed image may be a 2D image or a 3D image.

The entire disclosure of Japanese Patent Application No. 2016-050167, filed Mar. 14, 2016 is expressly incorporated by reference herein.

What is claimed is:

1. A head-mounted type image display device comprising:
   a disposition section that is disposed at a position corresponding to a forehead of a user;
   an image display section that has a left side display section and a right side display section which are respectively provided corresponding to a left eye and a right eye of the user, and respectively display an image to be observable for the user; and
   a pair of arms that are respectively positioned at portions on a front side of the disposition section, are rotatably supported on the disposition section about rotational shafts along a first direction that is a direction in which the left side display section and the right side display section are arranged, and support the image display section,
   wherein the rotational shafts are provided on a surface different from a surface facing the forehead in the disposition section and are positioned inside both end portions of the disposition section when viewed from a second direction orthogonal to the first direction, and
   each of the pair of arms has a connecting section extending in a third direction, the third direction being orthogonal to and rotatable about the first direction, each of the pair of arms extending from a respective one of the connecting sections to a respective one of the side display sections.

2. The head-mounted type image display device according to claim 1,
   wherein each of the pair of arms includes
   a shaft section that is rotatably supported on the disposition section, and
   a regulation section that abuts against the disposition section and regulates rotation of the image displayed by the left side display section and the right side display section from an observation position in which the image is capable of being observed at a user side.

3. The head-mounted type image display device according to claim 2,
wherein the shaft section is supported on a bottom portion of the disposition section.

4. The head-mounted type image display device according to claim 1,
wherein the pair of arms include
a left side arm that is connected to the left side display section, and
a right side arm that is connected to the right side display section,
wherein the left side arm includes
a left side shaft section that is rotatably supported on the disposition section,
a first left side extending section that extends from the left side shaft section on a side opposite to the right side arm along the parallel direction, and
a second left side extending section that is bent at a tip of the first left side extending section in an extending direction and is connected to a left side end portion in the left side display section, and
wherein the right side arm includes
a right side shaft section that is rotatably supported on the disposition section,
a first right side extending section that extends from the right side shaft section on a side opposite to the left side arm along the parallel direction, and
a second right side extending section that is bent at a tip of the first right side extending section in an extending direction and is connected to a right side end portion in the right side display section.

5. The head-mounted type image display device according to claim 1,
wherein one of each of the pair of arms and the image display section has a slide device which is connected to the other side slidably in a direction in which the image display section moves toward and away from the disposition section.

6. The head-mounted type image display device according to claim 1, further comprising:
a band section that extends from the disposition section and is disposed at a position corresponding to a back head of the user.

7. The head-mounted type image display device according to claim 6, further comprising:
a pad that is attached to a surface of the disposition section on a forehead side,
wherein the pad and the band section are configured of an elastic member.

8. The head-mounted type image display device according to claim 1, wherein the disposition section includes a control section that controls at least a part of the image display section, and
wherein the control section is covered by an inner case.

9. The head-mounted type image display device according to claim 8,
wherein the disposition section includes
ribs that extend from a surface of the disposition section on a vertical side and extend from an outer edge of the inner case toward the both ends of the disposition section, and
discharge openings that discharge a fluid flowing through the ribs to an outside of the disposition section.

10. The head-mounted type image display device according to claim 1,
wherein the disposition section is mounted on a covering member that is mounted on the head of the user.

11. A head-mounted type image display device that is used by being mounted on a covering member that is mounted on a head of a user and has a flange portion, the head-mounted type image display device comprising:
a disposition section that is disposed at a position of the covering member corresponding to a forehead of a user;
an image display section that has a left side display section and a right side display section which are respectively provided corresponding to a left eye and a right eye of the user, and respectively display an image to be observable for the user; and
a pair of arms that are respectively positioned at portions on a front side of the disposition section, are rotatably supported on the disposition section about rotational shafts along a parallel direction that is a direction in which the left side display section and the right side display section are arranged, and support the image display section,
wherein a length of a first perpendicular line extending from a virtual line to an upper surface of the image display section through a center of the rotational shaft and along the parallel direction is greater than a length of a second perpendicular line extending from the virtual line to the foremost end of the flange portion when viewing the covering member on which the head-mounted type image display device is mounted in a direction along the parallel direction.

12. The head-mounted type image display device according to claim 11,
wherein the rotational shafts are provided on a surface different from a surface facing the forehead in the disposition section and are positioned inside both end portions of the disposition section when viewed from a direction orthogonal to the parallel direction.

* * * * *